(12) United States Patent
Loebel et al.

(10) Patent No.: US 6,766,129 B2
(45) Date of Patent: Jul. 20, 2004

(54) APPARATUS AND METHOD FOR GUIDING A BELT-SHAPED CONTINUOUS CARRIER IN AN ELECTROGRAPHIC PRINTER OR COPIER

(75) Inventors: Markus Loebel, Freising (DE); Stefan Maier, Pliening (DE)

(73) Assignee: Oce Printing Systems GmbH (DE)

( * ) Notice: Subject to any disclaimer, the term of this patent is extended or adjusted under 35 U.S.C. 154(b) by 0 days.

(21) Appl. No.: 10/313,490

(22) Filed: Dec. 6, 2002

(65) Prior Publication Data

US 2003/0123903 A1 Jul. 3, 2003

(30) Foreign Application Priority Data

Dec. 10, 2001 (DE) .......................................... 101 60 606

(51) Int. Cl.$^7$ .............................................. G03G 15/00
(52) U.S. Cl. ..................................................... 399/165
(58) Field of Search ................................. 399/165, 162, 399/164, 166, 167

(56) References Cited

U.S. PATENT DOCUMENTS 4,563,077 A  * 1/1986 Komada ....................... 399/165
5,257,071 A  * 10/1993 Hediger ....................... 399/165
6,181,900 B1  1/2001 Lee et al.

FOREIGN PATENT DOCUMENTS

| DE | 2 358 069 | 6/1974 |
| DE | 694 11 200 T2 | 7/1994 |
| EP | 0 038 207 | 10/1981 |
| WO | WO 00/34831 | 6/2000 |
| WO | WO 00/54266 | 9/2000 |
| WO | WO 01/11432 A1 | 2/2001 |

* cited by examiner

Primary Examiner—Quana Grainger
(74) Attorney, Agent, or Firm—Schiff & Hardin LLP

(57) ABSTRACT

An apparatus and a method for guiding a belt-shaped continuous carrier material in an electrographic printer or copier provides that a continuous belt-shaped carrier material is guided over at least one roller element, the roller element having a trail with respect to the conveying direction of the carrier material. Further, a device for guiding a continuous belt-shaped carrier material in an electrographic printer or copier is provided, in which a roller element can be displaced and/or tilted transversely to the carrier material.

21 Claims, 19 Drawing Sheets

APPARATUS AND METHOD FOR GUIDING A BELT-SHAPED CONTINUOUS CARRIER IN AN ELECTROGRAPHIC PRINTER OR COPIER

BACKGROUND OF THE INVENTION

1. Field of the Invention

The present invention relates to a device and a method for guiding a belt-shaped continuous carrier material in an electrographic printer or copier, the carrier material being guided over at least one roller element. The longitudinal axis of the roller element runs substantially transversely to the conveying direction of the carrier material.

2. Description of the Related Art

In electrographic printers and copiers, toner images are often transferred from a toner carrier belt onto a carrier material. The toner carrier belt carries the toner image to be transferred and has a predetermined belt tension. Such toner carrier belts can, for example, be transfer belts for transferring toner images or photoconductor belts for generating toner images. Published PCT Patent Application WO 00/54266 of the same applicant discloses a device for transferring at least one toner image from a toner carrier belt onto a carrier material. The toner carrier belt is guided such that, when a swivel arrangement performs a swivel motion, the belt tension always remains constant.

Published PCT Patent Application WO 01/11432 of the same applicant discloses a method and a controller for the position control of a belt-shaped image carrier in an electrographic printer or copier. The lateral position of the belt-shaped intermediate image carrier is detected at regular intervals by a device-integrated sensor with the aid of a position mark. With the aid of position correcting means, a correction of the position of the intermediate image carrier transverse to the transport direction is implemented corresponding to the detected position and desired position values.

Owing to production variations, circulating toner carrier belts have slightly different lengths and have a slight comicality, or conical shape. However, in the printer or copier, the toner carrier belts must have a defined tensile stress. Published PCT Patent Applications WO 91/11432 and WO 00/54266 disclose devices for length compensation and for conicality compensation. In addition to a tensioning motion in direction of circulation, such an arrangement must also be able to perform a tilting motion of up to approximately ±5°. The tilting motion is required by the conicality of the belt. Up to now, the tilting motion has been realized by an axis mounted in plain bearing's. Due to the friction of the plain bearings, a tilting motion without jerking is not possible because of the so-called stick-slip-effect. Further, such a mounting has a clearance and has to be additionally fixed in an axial direction. The elements for generating the tilting motion have to be manufactured very precisely in order not to disturb the run of the belt during a tilting motion.

In electrographic printers or copiers, toner carrier belts are guided over several rigidly rollers or over lever mounted deflection rollers, the belt being driven by at least one of these rollers. For this purpose, elements have to be provided that guarantee a constant belt tension and, at the same time, a uniform lateral run of the belt. Further, the possibility that the carrier material may have a conicality has to be taken into account and compensated for. Slight deviations in the parallel alignment of the rollers and a slight conicality of the belt-shaped carrier material already result in force differences between the two belt edges. The belt-shaped carrier material tends to compensate for these force differences, as a result of which the belt drifts, or moves, in a lateral direction. Safe running of the carrier material is thus no longer guaranteed.

In known arrangements, a tensioning device having a roller that presses against the carrier material is provided for the tensioning of the carrier material. The roller of the tensioning device can be tilted orthogonally to its longitudinal axis, i.e. it can be rotated, so that the tension roller can perform a tilting motion imparted by the belt. The components of such a tensioning and tilting device may only have very little manufacturing tolerances. Although an improvement of the belt run can be achieved by means of the known device, such a device for guiding the belt-shaped carrier material is then very expensive und thus not suitable for mass application in printers and copiers.

Another known arrangement provides a further roller that can be tilted relative to the carrier material, in addition to the roller for tensioning the carrier material. In this way, a conicality of the carrier material can be compensated for and forces that result in a lateral drift can be compensated for; however, the angle of tilt has to be determined in a trial run and has to be set. After transport of the printer or copier as well as when the properties of the carrier material change, the angle of tilt has to be re-determined and re-set. Thus, comprehensive setting work is necessary in order to guarantee a safe running of the carrier material.

SUMMARY OF THE INVENTION

The present invention provides a device and a method for guiding a belt-shaped continuous carrier material in an electrographic printer or copier, in which a safe running of the carrier material is guaranteed with simple means.

This is achieved in one embodiment by a device for guiding a belt-shaped continuous carrier material in an electrographic printer or copier, having a belt-shaped continuous carrier material that is guided over at least one roller element, the longitudinal axis of the roller element running substantially transversely to the conveying direction of the carrier material during normal operation, at least one rotary arrangement by means of which the roller element can be rotated about a rotational axis running substantially orthogonally to the longitudinal axis, the rotational axis intersecting the carrier material, as viewed in the conveying direction thereof, before the bisector of the circular arc of the roller element that is covered with carrier material.

It is also achieved according to another embodiment by a device for guiding a belt-shaped continuous carrier material in an electrographic printer or copier, having a belt-shaped continuous carrier material that is guided over at least one roller element, a roller support in which the ends of the roller element are mounted, at least one elastic fastener that connects the roller support to the frame such that the roller support can be longitudinally displaced relative to the carrier material and/or transversely tilted relative to the carrier material.

It is further achieved by a method for guiding a belt-shaped continuous carrier material in an electrographic printer or copier, in which a belt-shaped continuous carrier material is guided over at least one roller element, the longitudinal axis of the roller element running substantially transversely to the conveying direction of the carrier material during normal operation, the roller element is rotated by means of at least one rotary arrangement about a rotational axis running substantially orthogonally to the longitudinal axis, and in which the carrier material, as viewed in the conveying direction thereof, is intersected by the rotational axis before the bisector of the circular arc of the roller element that is covered with carrier material.

BRIEF DESCRIPTION OF THE DRAWINGS

Further features and advantages of the invention result from the following description which together with the attached drawings explains the invention with reference to embodiments.

DETAILED DESCRIPTION OF THE PREFERRED EMBODIMENTS

Figure 1:
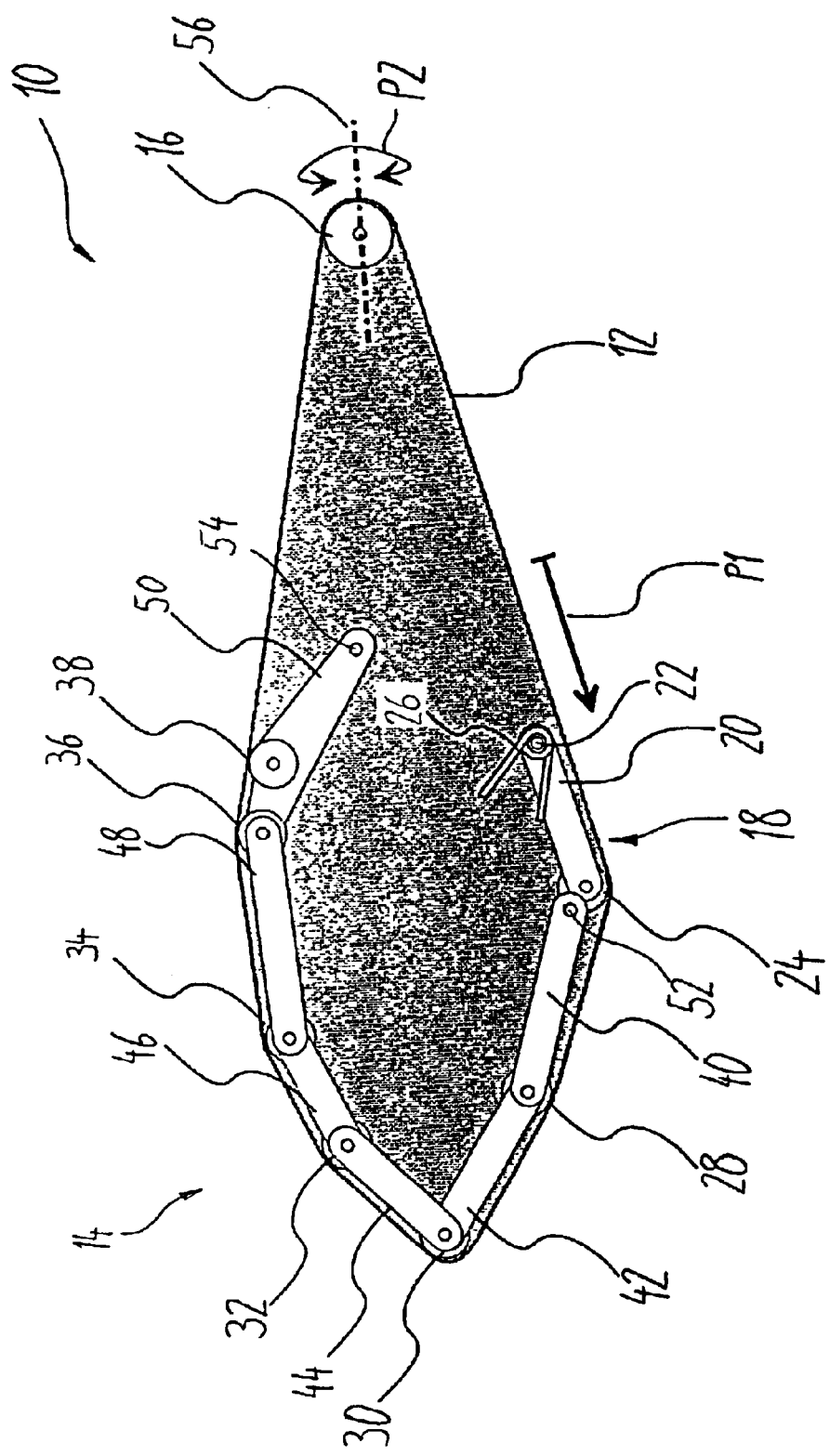
FIG. 1 is a side view that shows a coupler lever movement mechanism for guiding a circulating belt comprising a tensioning device and a swivable drive roller.

In a device for guiding a belt-shaped continuous carrier material, the continuous carrier material is, according to a first aspect of the invention, guided over at least one roller element. With the aid of a rotary arrangement, the roller element can be rotated about a rotational axis running substantially orthogonally to the longitudinal axis. As viewed in the conveying direction of the carrier material, the rotational axis intersects the carrier material before the bisector of the circular arc of the roller element that is covered with carrier material, as a result whereof the belt-shaped carrier material runs smoothly and safely over the roller element. In contrast to known devices, a safe running of the belt is guaranteed in the inventive device even if force differences transverse to the carrier material are present. Even in the case of so-called stick-slip-effects, which, for example, occur with mounted pivots due to the static friction between the pivot and the bearing, a safe running of the belt is possible. The possibility that the carrier material may have an existing conicality is compensated for by the roller element with the aid of the rotary arrangement. The device has a simple structure, and cost-efficient components having the usual manufacturing tolerances can be used for the assembly of the device.

In one embodiment of the invention, the roller element is pulled relative to the conveying direction of the carrier material. As a result, a safe running of the carrier material where, in particular, the lateral position of the carrier material can be kept constant is guaranteed despite a rotatable arrangement of the roller element. A device in which the roller element is pulled relative to the conveying direction of the carrier material can be manufactured cost-efficiently with little effort.

In one development of this embodiment, the roller element has a trail. As a result thereof, a smooth running of the roller element is guaranteed. The roller element tends to exactly align itself transversely to the carrier material. Further, by means of the rotary device a compensation of the conicality of the belt is guaranteed. A safe belt run and a constant lateral position of the carrier material can thus be realized in a simple and cost-efficient way.

In another embodiment of the invention, the continuous belt-shaped carrier material is a circulating belt, such as a photoconductor belt, a transfer belt or an applicator belt. Such belts are in particular used in high-performance printing systems and high-performance copying systems and do often have high rotational speeds. It is particularly advantageous to use an inventive device for guiding a belt-shaped continuous carrier material for guiding such circulating belts since with this device damage to the belt and to the printer or copier can be avoided.

In a further advantageous embodiment of the invention, the continuous carrier material is a paper web. Paper webs are used in printers or copiers as a carrier material that is to be printed. For high-quality printing products, a safe running and a constant lateral position of the paper web during transport through the printer or copier is necessary. With simple means, a device according to the invention guarantees such a safe run of the paper web.

In another development of the invention, the roller element is guided with the aid of a lever arm arrangement that is pre-tensioned by a spring. A spring force of the spring presses the roller element against the continuous carrier material. As a result, the continuous carrier material is not only guided by the roller element but also tensioned. A tensioning device with the aid of a spring and a lever arm arrangement is very cost-efficient and can easily be manufactured, and such an arrangement only requires a little space.

In another embodiment of the invention, the roller element can be pivoted about the rotational axis in a region such that the conicality of the carrier material and/or of the roller element can be compensated. As a result, manufacturing tolerances of the carrier material and of the roller element can simply be compensated for by the inventive device.

In another advantageous development of the invention, the rotary arrangement includes at least two leaf spring elements that are arranged substantially transversely to the direction of motion of the carrier material at a distance such that they form a four-bar linkage, a center of revolution of the four-bar linkage forming the rotational axis. As a result, it is achieved that in contrast to rotary arrangements with plain bearings a rotary motion without jerking is possible and that the center of revolution of the four-bar linkage can easily be determined by the arrangement of the leaf spring elements. In such a device, the rotational axis is not directly formed of components, as a result whereof it is possible that the rotational axis also runs outside the device or through components not belonging to the rotary arrangement. Additional space requirements and additional construction requirements for arranging the rotational axis are thus not necessary. The leaf spring elements can, for example, also be formed by a leaf spring.

In another advantageous embodiment of the invention, the carrier material is guided over a second roller element, a second rotary arrangement being provided by means of which the roller element can be rotated about a rotational axis running substantially orthogonally to the longitudinal axis of the second roller element. With the aid of this second rotary arrangement, the track of the carrier material can be adjusted. As a result, the carrier material is guided over two roller elements, one roller element assuring the constant tension of the carrier material and the second roller element serving to control the lateral position of the carrier material. With the aid of such a device, the carrier material has a constant tension and is safely guided. A lateral drift of the carrier material is effectively prevented by means of such a device by the second rotary arrangement. A constant straight-line motion of the carrier material is guaranteed.

In one development of the invention, the carrier material is guided over further roller elements arranged transversely to the direction of motion of the carrier material, the roller elements being connected to one another via a lever system such that, with a constant tension, the carrier material can be swiveled towards a second carrier material and can be swiveled away therefrom. As a result, a toner image that is present on the carrier material can be optionally transferprinted onto a second carrier material. Such an optional transfer of toner images is required particularly in multicolor printing, in which several toner images having different colors are superimposed.

By means of an inventive method for guiding a belt-shaped continuous carrier material in an electrographic printer or copier, a safe running of the carrier material is guaranteed. The method can be implemented cost-efficiently without great effort. The inventive method allows for a safe straight-line motion of the carrier material.

A device for guiding a belt-shaped continuous carrier material in an electrographic printer or copier has, according to a second aspect of the invention, a roller element over which the belt-shaped continuous carrier material is guided. A roller support, in which the ends of the roller element are mounted, is connected to a frame of the printer or copier with the aid of an elastic fastener such that the roller support can be displaced longitudinally to the carrier material and/or can be tilted transversely to the carrier material. As a result, the carrier material is guided safely and is kept in a set track. A lateral drift of the carrier material is prevented by this device, so that a safe running of the carrier material in the printer or copier is guaranteed. The device according to the invention has a simple structure and can be manufactured at low cost. This device does not include wear elements so that it can be operated almost maintenance-free.

In a development of the device, the elastic fastener comprises at least two leaf springs that are arranged substantially transversely to the direction of motion of the carrier material at a distance to one another such that they form a four-bar linkage. As a result, the roller can be swiveled about a center of revolution of the four-bar linkage, which means that a slightly conical carrier material can be guided safely in the printer or copier. By regulating the spring force, a variation of the distance between the springs and the used shape of the leaf springs, the inventive device can easily be adapted to the local conditions of the printer or the copier as well as to the properties of the carrier material.

In FIG. 1, a belt drive 10 is illustrated in which a continuous circulating belt 12 is guided over a coupler lever movement mechanism 14 and over a drive roller 16. The belt drive 10 further includes a tensioning device 18. The tensioning device 18 has a pivoted lever 20, the first end of which can be swiveled about a rigid rotational axis, and at the second end of which a roller 24 is rotatably mounted that serves as a tension roller. With the aid of a spring 26, the pivoted lever 20 is pre-tensioned such that the tension roller 24 presses against the belt 12 from the inside and tensions the same with a force set by the spring 26. The coupler lever movement mechanism 14 includes a plurality of rollers 28, 30, 32, 34, 36 and 38, which are connected to one another via levers 40, 42, 44, 46, 48 and 50. The ends of the levers 40 and 50, at which no rollers are arranged, have fixed rotational axes 52 and 54. The coupler lever movement mechanism 14 is used for the optional transfer of toner images to, or, respectively, from the belt 12, a drive unit 55 moving at least one lever. The possible movement of the coupler lever movement mechanism 14 is explained in more detail below in the description regarding FIG. 4.

The drive roller 16 can be swiveled about the rotational axis 56 with the aid of a device (not illustrated) and an actuator (not illustrated). The rotational axis 56 runs approximately in the center of the drive roller 16 orthogonally to the longitudinal axis thereof. The swiveling range of the drive roller is illustrated by the arrow P2. By swiveling the drive roller 16 about the rotational axis 56, the lateral position of the belt 12 which is detected with the aid of sensors (not illustrated) is controlled, as a result whereof a lateral drift of the belt 12 is prevented when the belt 12 is moved in the direction of an arrow P1. By means of this control, a lateral drift of the belt 12 is prevented, which, for example, results owing to a force difference caused by a belt 12 that is somewhat conical in shape as a result of production tolerances. A lateral drift of the belt 12 can likewise be caused by a not exactly parallel alignment of the rollers 16, 24, 28, 30, 32, 34, 36 and 38. In addition, a force difference of about 5% of the total tension force, e.g. ±8 N for a total tension force of 150 N, caused by the tensioning device 18 transversely to the belt 12 has the effect that a safe belt run of the belt 12 is no longer guaranteed and the belt 12 drifts unstoppably to a roller end.

Figure 2:
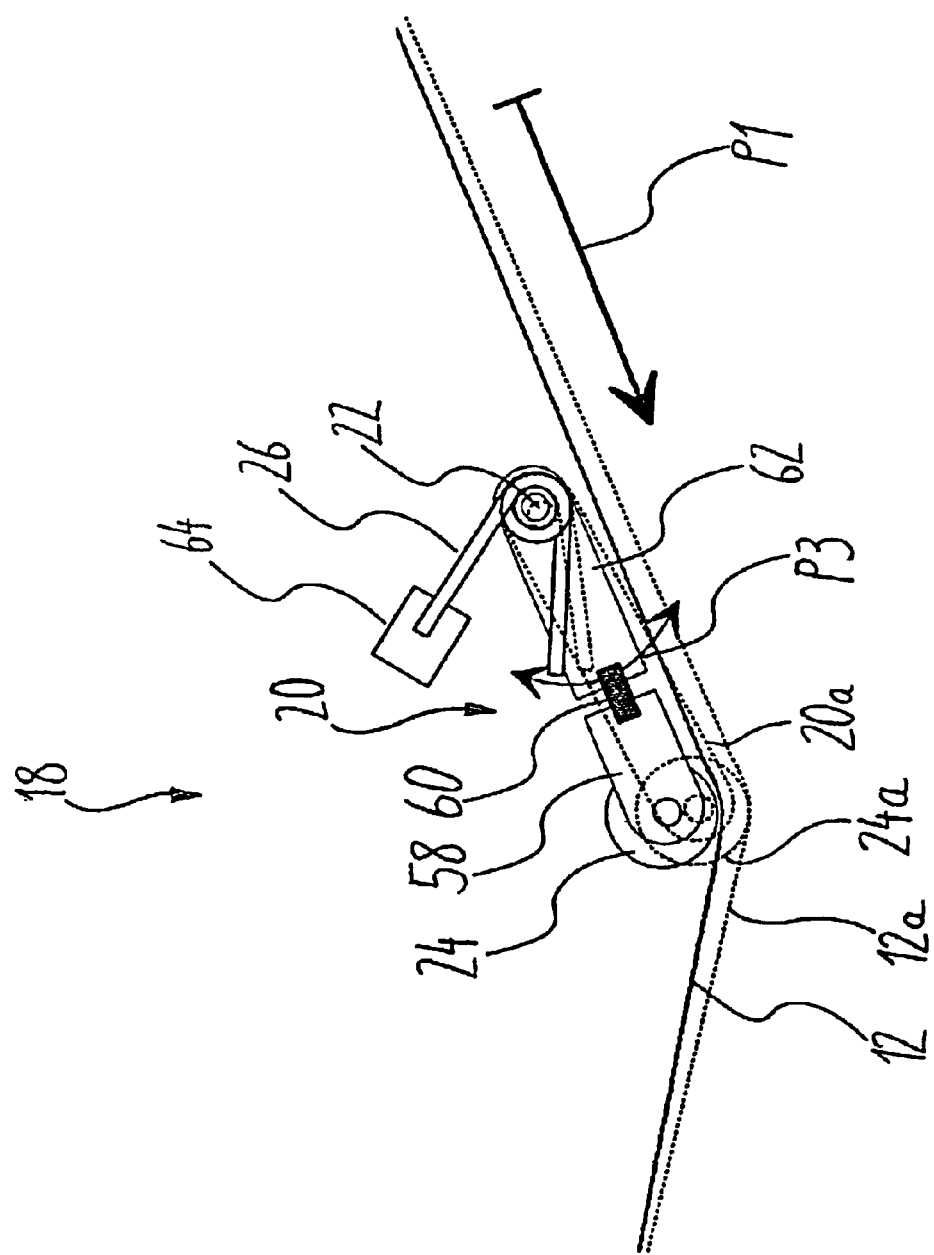
FIG. 2 is a side view of the tensioning device according to FIG. 1.

In FIG. 2, a side view of the tensioning device 18 is shown. The same elements have the same reference signs. The pivoted lever 20 of the tensioning device 18 includes a roller support 58 for receiving the ends of the roller 24. The roller support 58 is rotatably connected to a swivel element 62 via a pivot 60. The swivel element 62 can be pivoted about the rotational axis 22 in the direction of arrow P3. One end of the spring 26 is connected to a support bearing 64 that is fixed to the frame (not shown) of the printer or copier. The other end of the spring 26 engages the swivel element 62 of the pivoted lever 20. If, instead of the belt 12, a longer belt 12a is used or if the length of the belt increases, for example, due to aging, then the belt 12 assumes the belt position illustrated in broken lines in FIG. 2 because of the tension force generated by the tensioning device 18, the roller 24 pressing with a set force from the inside against the belt 12, as already described in connection with FIG. 1. The roller 24 then assumes the position 24a illustrated in broken lines and the pivoted lever 20 assumes the position 20a illustrated in broken lines.

Figure 3:
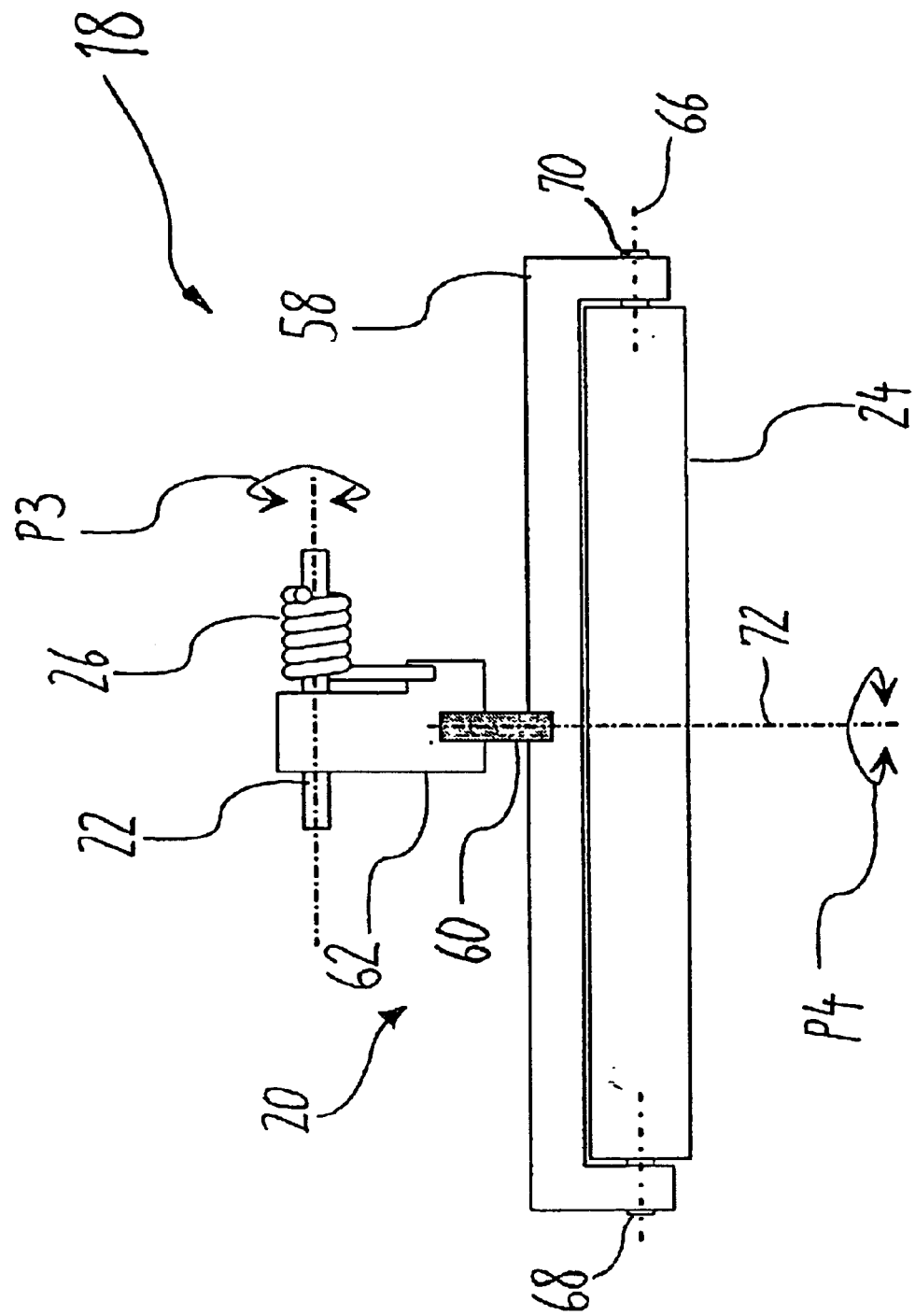
FIG. 3 is a top view of the tensioning device shown in FIG. 2.

In FIG. 3, a top view of the tensioning device 18 is illustrated. The longitudinal axis of the pivot 60 forms a rotational axis 72 about which the roller support 58 can be rotated relative to the swivel element 62 in direction of arrow P4, as a result whereof, even when using a conical belt, the roller 24 can be oriented to the belt 12 such that the tension force set by the spring 26 acts uniformly on the full belt width. As already mentioned in connection with FIG. 2, the roller ends 68 and 70 of the roller 24 are mounted in the roller support 58. The rotational axis 72 is orthogonal to the longitudinal axis 66 of the roller 24 as well as to the rotational axis 22 of the pivoted lever 20.

Figure 4:
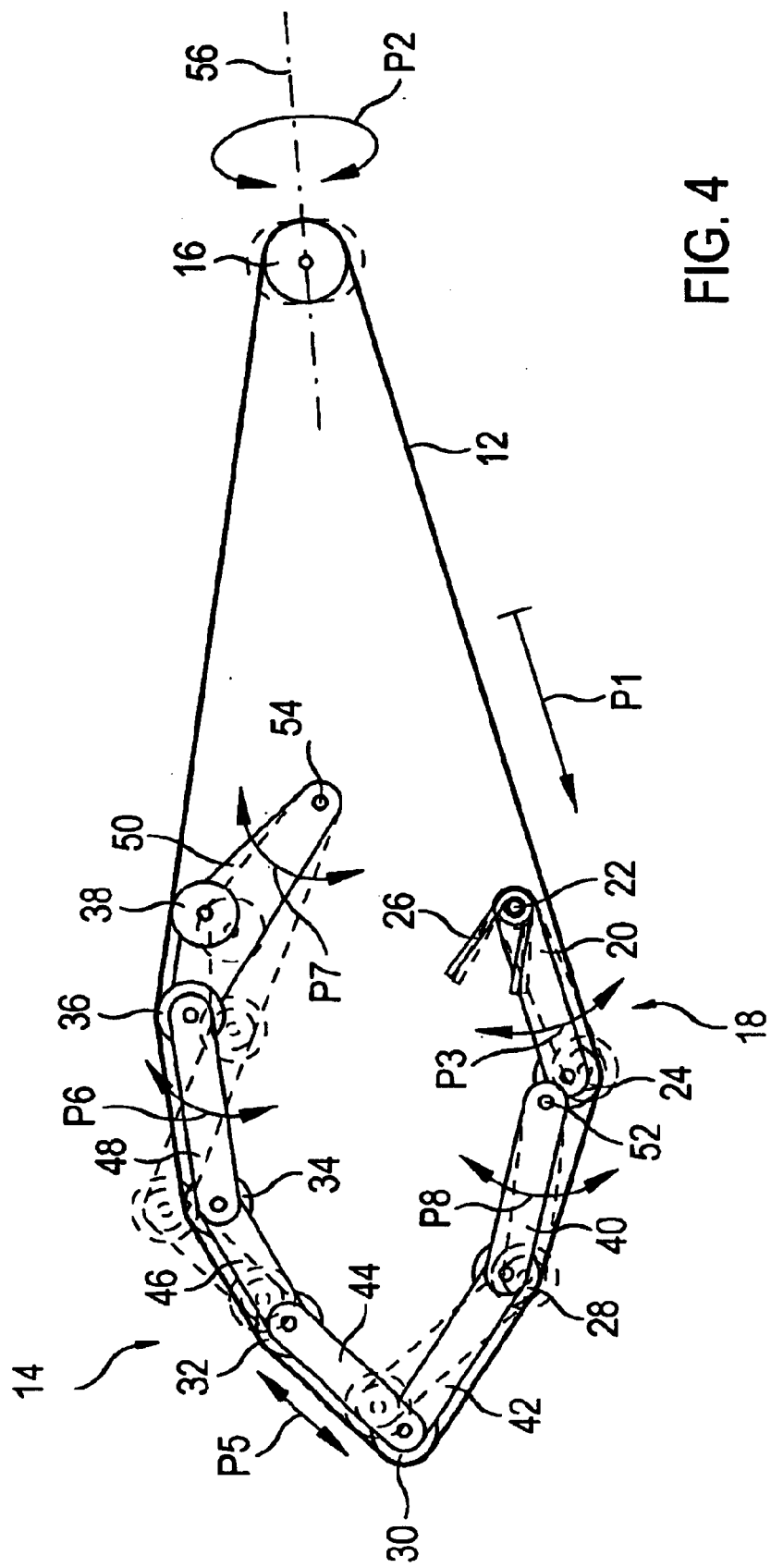
FIG. 4 is a side view that shows the coupler lever movement mechanism according to FIG. 1, a swivel motion of the coupler lever mechanism and a swivel motion of the drive roller being illustrated in broken lines.

FIG. 4 shows the belt drive 10 according to FIG. 1, a change of position of the coupler lever movement mechanism 14 and a rotation of the drive roller 16 about the rotational axis 56 being illustrated in broken lines. The lever 44 can be displaced in the direction of an arrow P5 with the aid of an actuator (not shown). By displacing the lever 44, the positions of the levers 40, 42, 46, 48 and 50 as well as the positions of the rollers 28, 30, 32, 34, 36 and 38 are changed. The change of position of the levers 48, 50 and 40 is indicated by the arrows P6, P7 and P8. The tensioning motion of the tensioning device 18 is indicated by the arrow P3, a possible changed position of the pivoted lever 20 and of the tension roller 24 being illustrated in broken lines.

The coupler lever movement mechanism 14 which can be displaced by moving the coupler lever 44 in the direction of arrow P5, serves above all for advancing the belt 12 to further toner carrier materials, e.g. in the region of the roller 30 and in the region of the roller 36. As a result thereof, in particular in multicolor printing, the transfer of toner images from and onto other carrier materials, such as from a photoconductor belt to the belt 12 and from the belt 12 to a paper web can be effected in a simple way. As already mentioned, the drive roller 16 can be rotated about the rotational axis 56 in the direction of the arrow P2 in order to control the lateral position and the drift of the belt 12. Possible positions of the drive roller 16 are likewise illustrated in broken lines.

Figure 5:
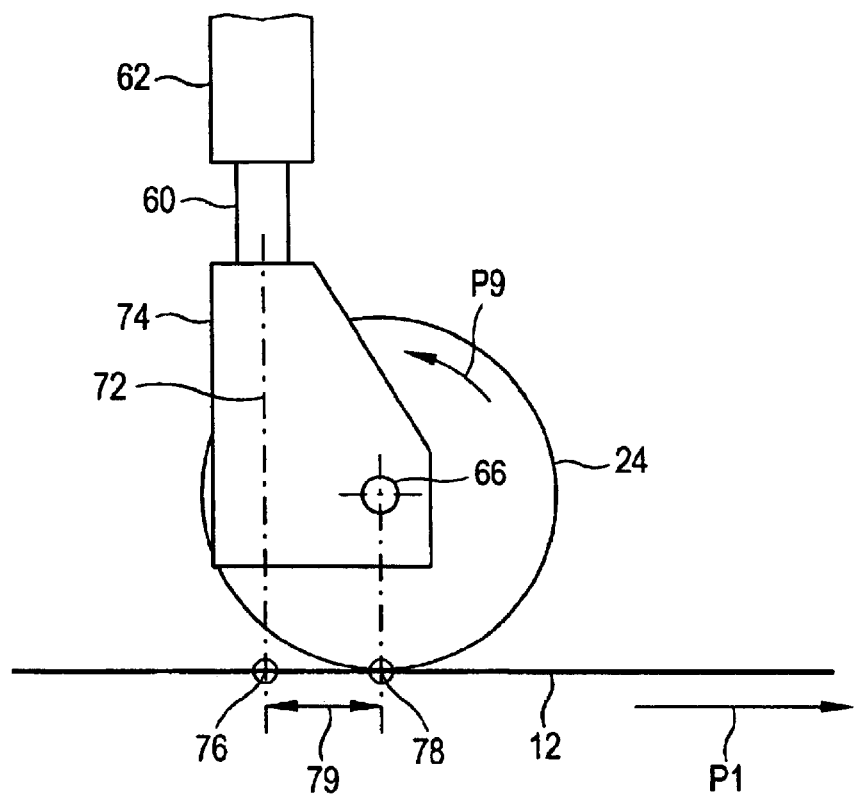
FIG. 5 is an enlarged side view that shows a detail of the tensioning device according to FIG. 2 in a second embodiment.

In FIG. 5, a side view of a roller support 74 in a second embodiment of the tensioning device 18 for receiving the roller 24 is illustrated. In the same way as the roller support 58 in the tensioning device 18 according to FIGS. 2 and 3, the roller support 74 is rotatably connected to the swivel element 62 via a pivot 60. When the belt 12 is moved in the direction of the arrow P1, the tension roller 24 is rotated about its longitudinal axis 66.

The roller support 74 is rotatable about the rotational axis 72 of the pivot 60. This rotational axis 72 intersects the belt 12 in the point 76. The roller 24 contacts the belt 12 in the area 78. In the arrangement illustrated in FIG. 5, the roller 24 contacts the belt 12 at a point 78. In contrast thereto, in the arrangements according to FIGS. 1 through 4, the belt 12 encloses a portion of the circumference of the roller 24, i.e. a sector of the circle of the roller 24. In the devices according to FIGS. 1 through 4, the point of tangency 78 between the roller 24 and the belt 12 is the bisector of the circular arc of the roller 24 that is covered with the belt 12. As viewed in the conveying direction P1 of the belt, the rotational axis 72 intersects the belt 12 before the point of tangency 78 between the roller 24 and the belt 12. Thus, the roller 24 has a so-called trail 79, so that as a result a very smooth roller running and thus a very stable belt run of the belt 12 is possible. Disturbing influences on the belt run, such as a slightly conical belt 12 or an incorrect parallel alignment of the rollers 24, 28, 30, 32, 34, 36 and 38, has a considerably smaller influence on the stable belt run in the case of a roller support 74 with a trail 79. A roller 24 that is arranged in a roller support 74 with a trail 79 is also referred to as a pulled roller 24.

Figure 6:
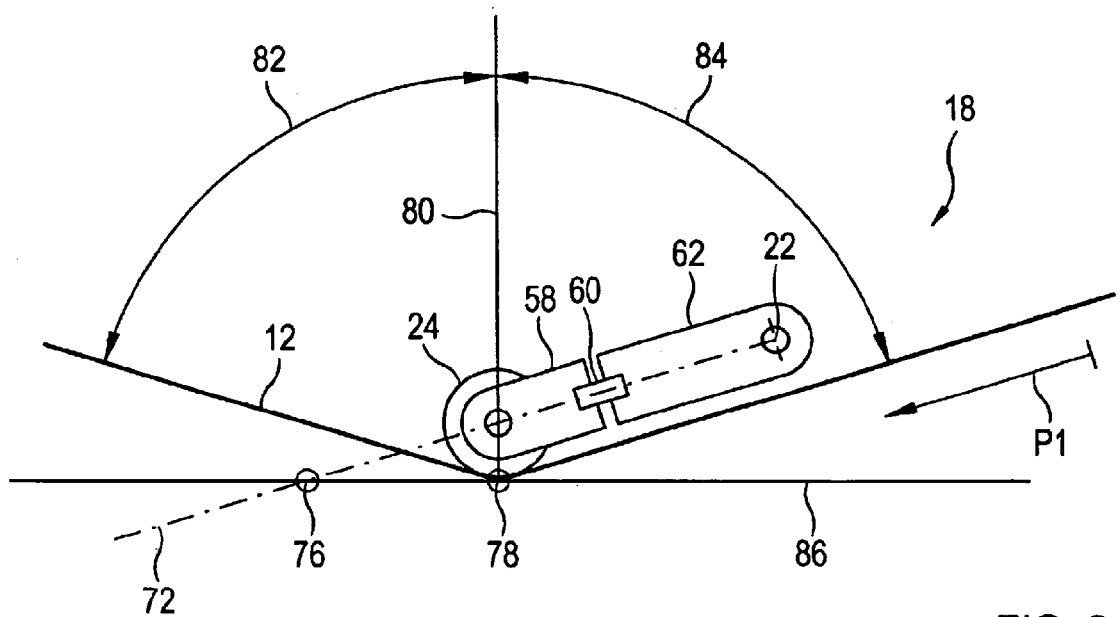
FIG. 6 shows a detail of the tensioning device illustrated in FIG. 2.

FIG. 6 shows a side view of the tensioning device 18 according to FIGS. 2 and 3. The angles 82 and 84 included by the belt 12 and a bisector 80 of the circular arc of the roller 24 that is covered with the belt 12 have the same size. A tangent 86 of the belt 12 runs through the point of intersection 78 of the bisector 80 and the belt 12. The point of intersection 76 between the rotational axis 72 and the tangent 86 lies behind the point of intersection 78, as viewed in the direction of motion P1 of the belt 12. Thus, in the arrangement according to FIG. 6, the roller 24 has a lead. The lead has the effect of a relatively poor belt guidance so that a stable run of the belt is not possible already with a slight conicality of the belt 12 that is caused by production.

In order to nevertheless be able to guarantee a stable run, the rollers of the belt drive 10 have to be aligned exactly parallel and the belt 12 must not have any conicality. Such an exactly parallel alignment of the rollers not only requires comprehensive setting work but also very precisely manufactured components which actually only allow for such a precise adjustment. The components of the tensioning device 18, too, have to be precisely manufactured and may only have a very little clearance in particular at the rotary elements such as the rotational axis 22 and the pivot 60. In particular, the rotation about the rotational axis 72 has to be effected in a smooth-running way without clearance in order to at least compensate for a slight conicality of the belt 12. However, for a pivot 60 mounted in a plain bearing or in a ball bearing a rotary motion is always subject to friction, as a result whereof so-called stick-slip-effects occur in which prior to a rotary motion a static friction between bearing and pivot 60 has to be overcome. Further, additional measures have to be taken in order to limit an axial clearance of the pivot 60.

With rotation of the drive roller 16 and the roller 24, in the belt drive 10 an existing non-parallelism of other rollers of the belt drive 10 is compensated for. Due to the mechanical tolerances of the individual components, an adjustment of the belt drive 10, in particular of the rollers, was, however, only possible by way of experiment during a trial run of the belt drive 10. For belt drives 10 having a roller width of 560 mm a possible tilting range of ±0.25 mm was determined in which a safe belt run is still possible. In this connection, the tilting range is a possible change of position of the roller 24 at the roller edges. After a transport of the printer or the copier as well as after replacement of the belt 12, a re-adjustment of the rollers is required in order to guarantee a safe belt run. In the arrangement shown in FIG. 6, it was determined that for a total tension force of 150 N, with which the belt 12 is tensioned with the aid of the tensioning device 18, a force difference of 8 N across the width of the belt 12 results in a instable belt run and in a drift of the belt that cannot be compensated for.

Figure 7:
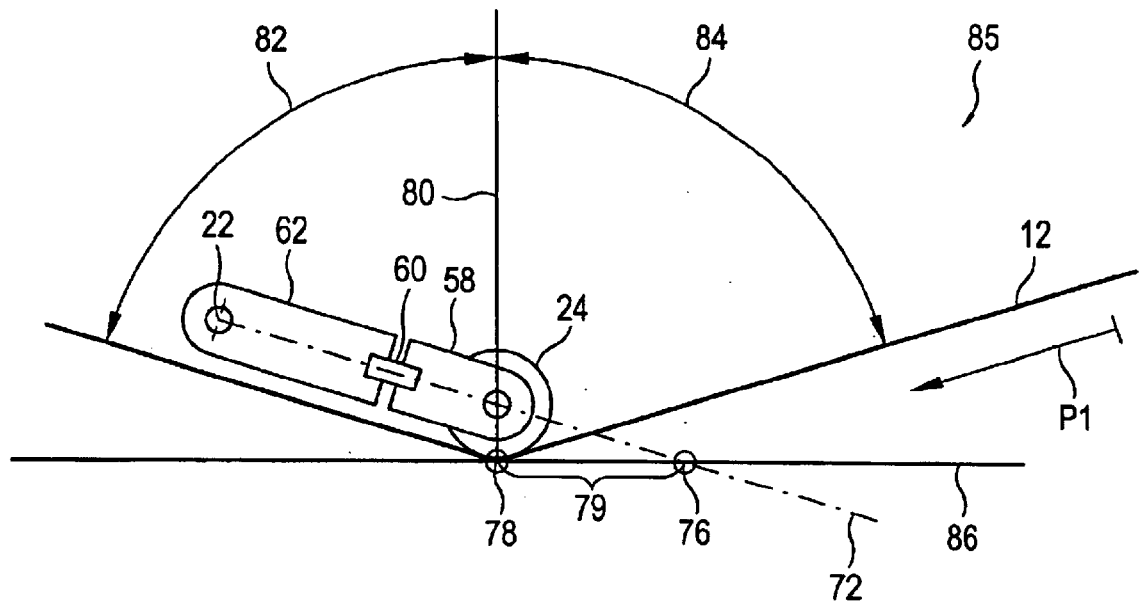
FIG. 7 is a side view that shows a third embodiment of the tensioning device.

In FIG. 7, a third embodiment of a tensioning device 85 is illustrated. The tensioning device 85 is structured similarly to the tensioning device 18 according to FIG. 6. In contrast to the tensioning device 18 shown in FIG. 6, the tensioning device 85 is arranged such that the point of intersection 76 of the rotational axis 72 and the tangent 86, as viewed in the conveying direction P1 of the belt 12, is arranged before the point of intersection 78 of the bisector 80 and the tangent 86 or, respectively, the belt 12. The longitudinal axes of the swivel element 62, of the roller support 58, that run approximately between the rotational axis 22 and the roller 24, approximately coincide with the longitudinal axis of the pivot 60, as a result whereof the longitudinal axes of the swivel element 62 and of the roller support 58 approximately coincide with the rotational axis 72.

Figure 8:
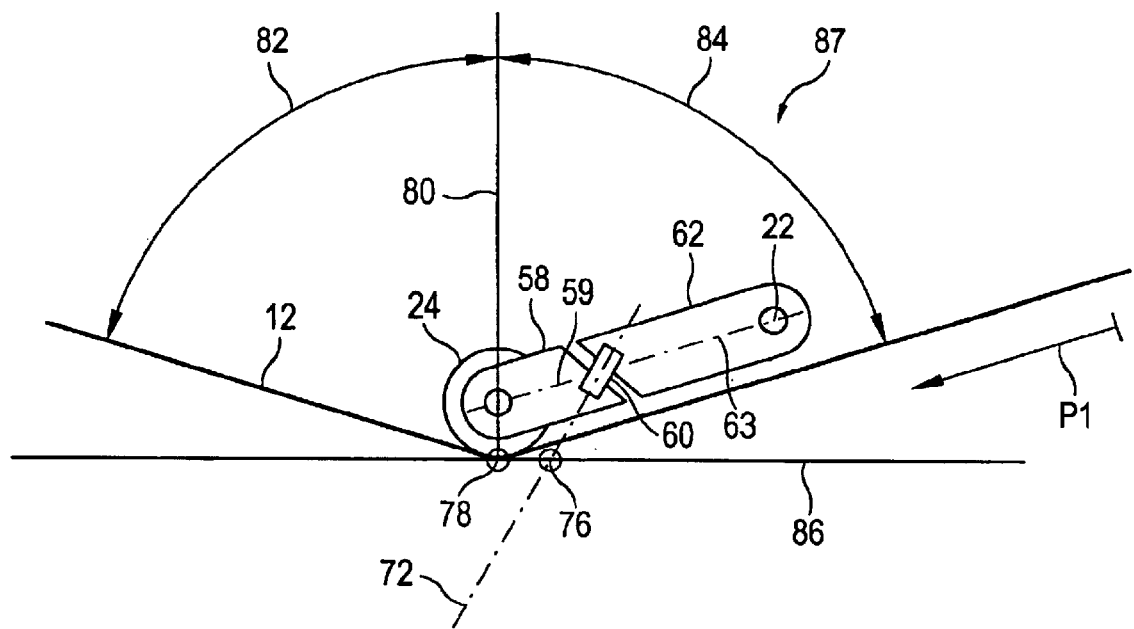
FIG. 8 is a side view that shows a fourth embodiment of the tensioning device.

In FIG. 8, a fourth embodiment of a tensioning device 87 according to the invention is illustrated. Essential elements of this tensioning device 87 correspond to the tensioning device 18 according to FIG. 6. The longitudinal axis of the roller support 58 has the reference sign 59 in FIG. 8 and the longitudinal axis of the swivel element 62 has the reference sign 63. In contrast to the tensioning device 18 according to FIG. 6, the longitudinal axis of the pivot 60 in the tensioning device 87 is rotated relative to the longitudinal axes 59, 63 of the swivel element 62 and the roller support 58 such that the longitudinal axis of the pivot 60 and thus the rotational axis 72 intersects the tangent 86 before the point of intersection 78 of the bisector 80 and the tangent 86, as viewed in the direction of motion of the belt 12. As a result thereof, it is achieved that the roller 24 has a trail and thus forms a pulled roller 24. With such a tensioning device 87, a safe belt run and a correct lateral guidance of the belt 12 is also possible in the case of a conical belt 12 and in the case of a not exactly parallel alignment of the rollers 24, 28, 30, 32, 34, 36, 38 and 16 for the tensioning device 85 according to FIG. 7 as well as for the tensioning device 87 according to FIG. 8 with cost-efficient components in a simple way. Force differences of up to 30% of the total tension force can be compensated for with these inventive tensioning devices 85 and 87, as a result whereof, a safe belt run is guaranteed.

Figure 9:
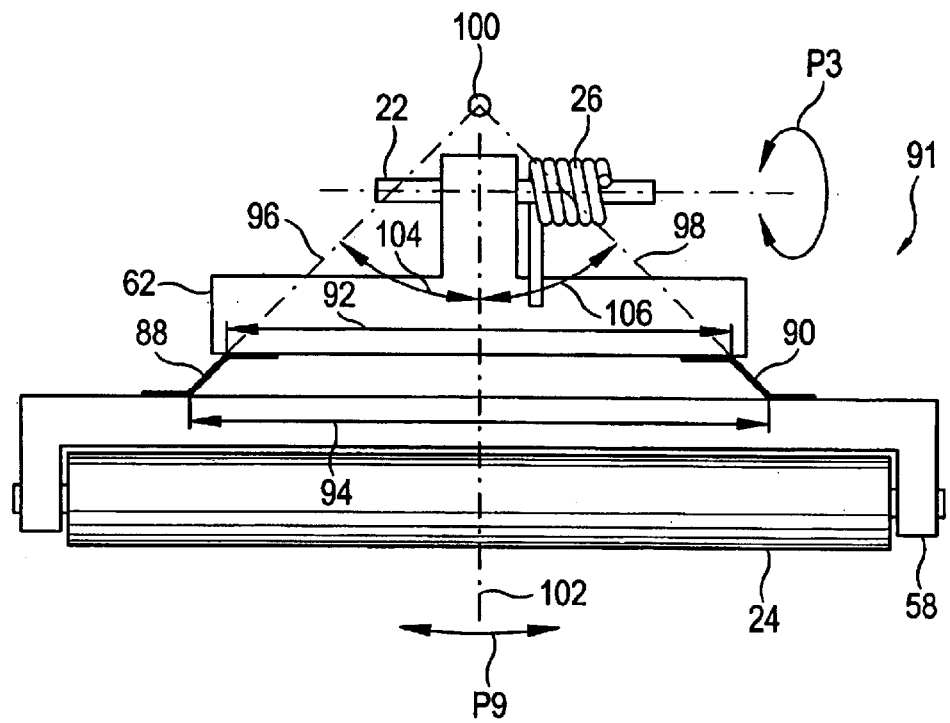
FIG. 9 is a top view of a fifth embodiment of the tensioning device.

In FIG. 9, a top view of a fifth embodiment of a tensioning device 91 according to the invention is shown. In contrast to the tensioning devices 18, 85 and 87 according to FIGS. 6 through 8, in the tensioning device 91 according to FIG. 9 two Z-shaped leaf springs 88 and 90 are used as a rotary element instead of the pivot 60. The leaf springs 88 and 90 are each rigidly connected to the roller support 58 and to the swivel element 62, as a result whereof the leaf springs 88 and 90, the roller support 58 and the swivel element 62 form a trapezoidal arrangement.

At the swivel element 62, the leaf springs 88 and 90 have a first distance 92 to one another and at the roller support 58 a second distance 94 to one another, the first distance 92 being smaller than the second distance 94. The roller support 58 and thus the roller 24 can be rotated in the direction of the arrow P9 relative to the swivel element 62. The longitudinal axes of the leaf springs 88 and 90 each form a pole line 96 and 98 that have a common point of intersection 100. The trapezoidal arrangement of the swivel element 62, the roller support 58 and the leaf springs 88 and 90 forms a four-bar linkage of a lever mechanism, the distance 92, the distance 94 and each leaf spring 88 and 90 each forming a lever. The point of intersection 100 is the center of revolution of this four-bar linkage. The four-bar linkage is also referred to as quadrilateral link. A bisector 102 of the angle spread out by the pole lines 96 and 98 approximately coincides with the longitudinal axes of the swivel element 62 and of the roller support 58. The leaf springs 88 and 90 are arranged such that the angles 104 and 106 respectively included between the bisector 102 and the pole lines 96 and 98 each amount to approximately 47°. The included angles 104 and 106 can be preset in the range from 5° to 9°. It is particularly advantageous to set the angles to a value in the range from 30° to 70°.

Figure 10:
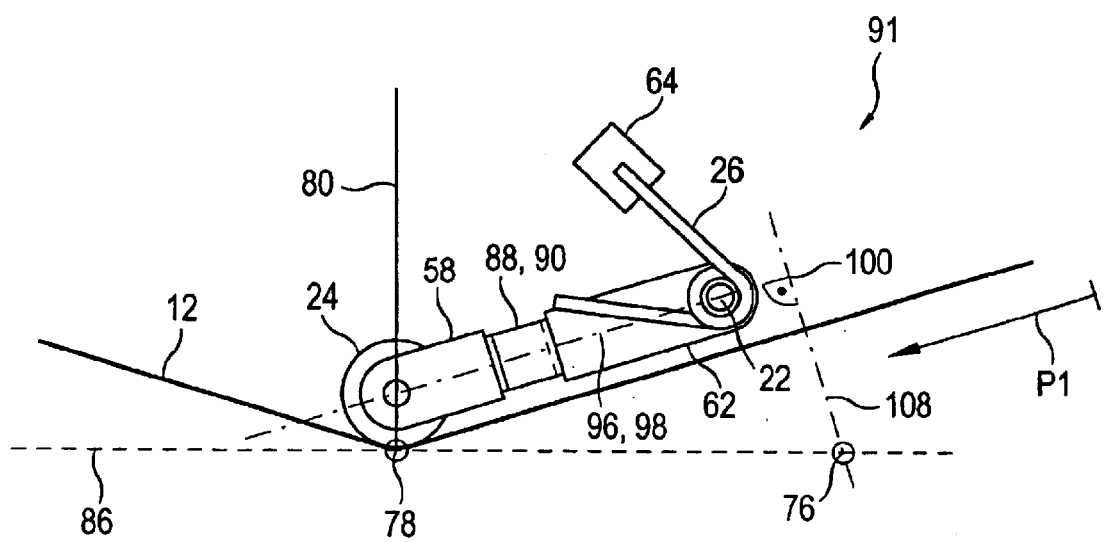
FIG. 10 is a side view of the fifth embodiment of the tensioning device.

In FIG. 10, a side view of the tensioning device 91 according to FIG. 9 is illustrated. A rotational axis 108 that intersects the tangent 86 in the point 76 runs through the center of revolution 100 orthogonally to the pole axes 96 and 98. As viewed in the direction of motion P1 of the belt 12, the rotational axis 108 is directed through the belt 12 before the point of tangency 78 between the roller 24 and the belt 12. As a result thereof, the roller 24 has a trail and is a pulled roller 24. As a result thereof, a safe belt run is guaranteed even when the tension force does not act uniformly across the width of the belt 12 on the belt 12. The use of leaf springs 88, 90 can be realized at very low cost in contrast to an arrangement with pivots 60, complicated and cost-intensive arrangements for shearing the axial clearance of the pivot 60 and for reducing the stick-slip-effect not having to be provided.

Figure 11:
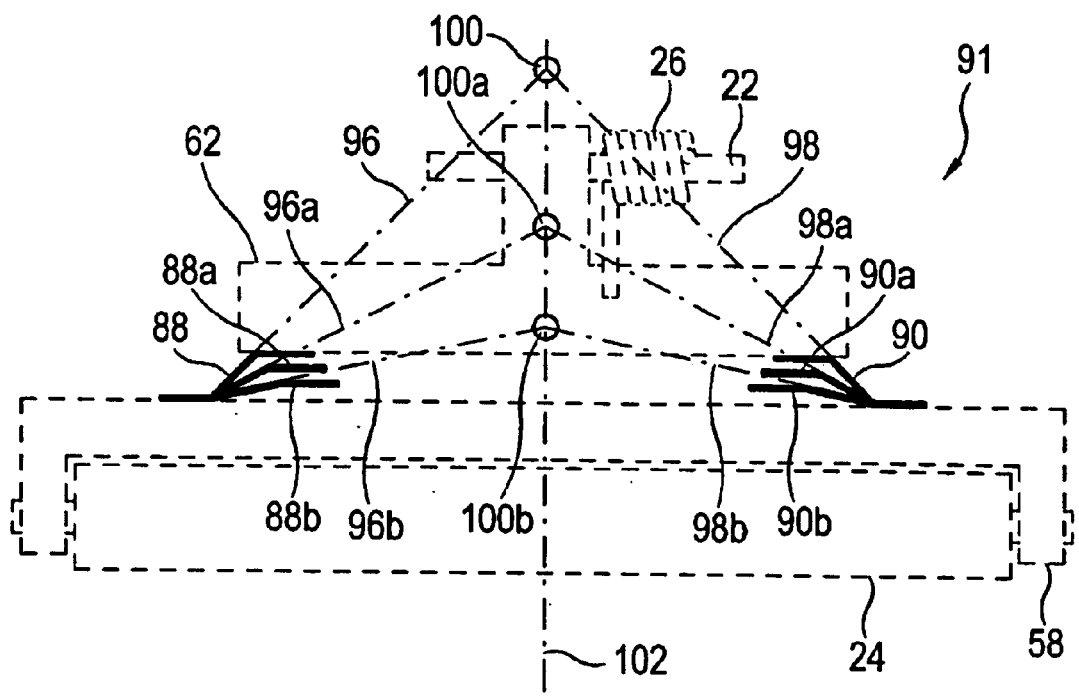
FIG. 11 is an end view that shows a displacement of the center of revolution with different spring shapes in the tensioning device.

In FIG. 11, a top view of the tensioning device 91 according to FIG. 9 is illustrated, the effects of different inclinations of the leaf springs 88 and 90 on the position of the center of revolution 100 being shown. If, instead of the leaf springs 88 and 90, leaf springs 88a and 90a having a lower incline are used, the slope of the pole line 96 and 98 likewise changes, the position of the pole lines 96a and 98a forming a center of revolution 100a. In contrast to the center of revolution 100, the center of revolution 100a is displaced towards the roller 24 on the bisector 102. The leaf springs 88b and 90b have an even smaller incline than the leaf springs 88a and 90a, the pole lines 96b and 98b forming the center of revolution 100b in their point of intersection.

Compared to the center of revolution 100a, the center of revolution 100b is further displaced towards the roller 24 on the bisector 102. Due to the displacement of the center of revolution 100 owing to the different leaf springs 88, 90; 88a, 90a; 88b, 90b, the rotational axis 108 is likewise displaced due to the displacement of the centers of revolution 100, 100a and 100b. The rotational axes formed by the centers of revolution 100a and 100b are displaced on the bisector 102 parallel to the rotational axis 108, as a result whereof the point of intersection 76 is displaced towards the point of intersection 78. The trail resulting from the distance between the points of intersection 78 and 76 is reduced by the lower incline of the Z-shaped leaf springs 88a, 90a, 88b and 90b.

Figure 12:
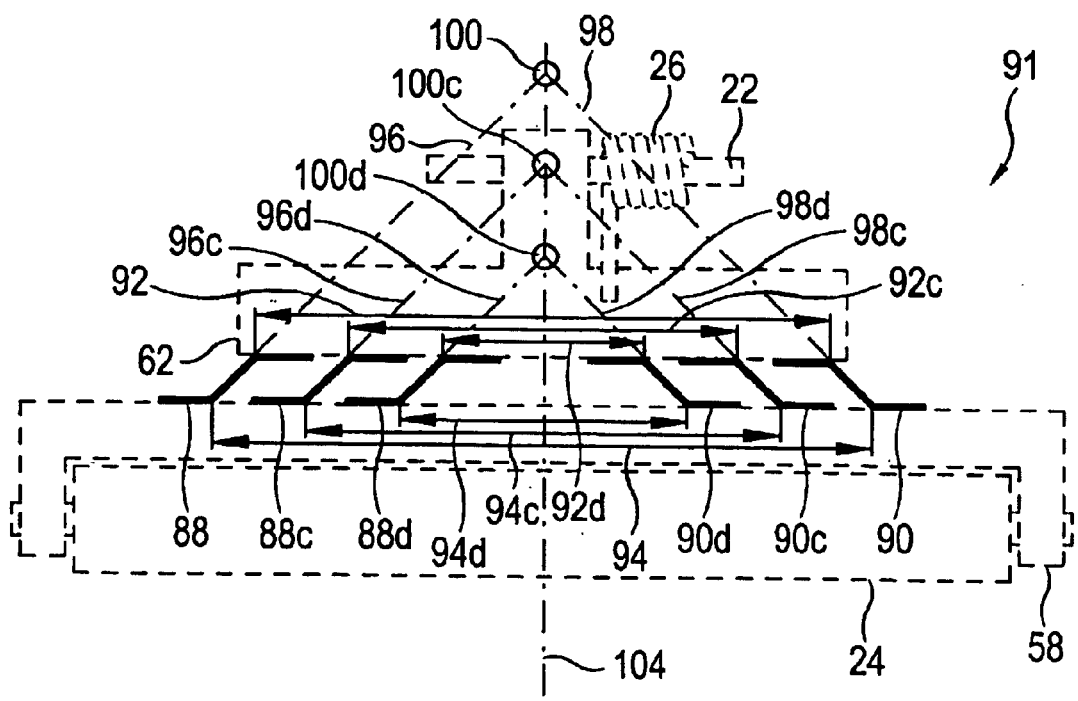
FIG. 12 is a view similar to FIG. 11 which shows a displacement of the center of revolution when the distance between the springs is varied.

In FIG. 12, a top view of the tensioning device 91 according to FIGS. 9 to 11 is illustrated, the effects of the different distances of the leaf springs 88 and 90 on the position of the center of revolution 100 being illustrated. As already described in connection with FIG. 9, the leaf springs 88 and 90 are arranged at a distance 92 at the swivel element 62 and at a distance 94 at the roller support 58 and respectively rigidly connected thereto. If, instead of the leaf springs 88 and 90, the leaf springs 88c and 90c are arranged, the respective distances 92c and 94c of which are each time smaller than the distances 92 and 94, the pole lines 96 and 98 are displaced such that they form a center of revolution 100c that is, relative to the center of revolution 100, displaced on the bisector 102 towards the roller 24.

If, instead of the leaf springs 88 and 90, the leaf springs 88d and 90d are fixed at the swivel element 62 at a mutual distance 92d that is even smaller than the mutual distance at which the leaf springs 88c and 90c are fixed to the swivel element 62, the distance 94d being likewise smaller than the distance 94c, then the center of revolution 100 is further displaced towards the roller 24 and the pole lines 96c and 98c form the center of revolution 100d. By means of leaf spring arrangements according to FIGS. 11 and 12, the position of the center of revolution 100 and thus of the rotational axis 108 can be varied in a simple way. As a result thereof, the tensioning device 91 can be very easily adapted to the requirements of different belt drives 10 and different belts 12.

Figure 13:
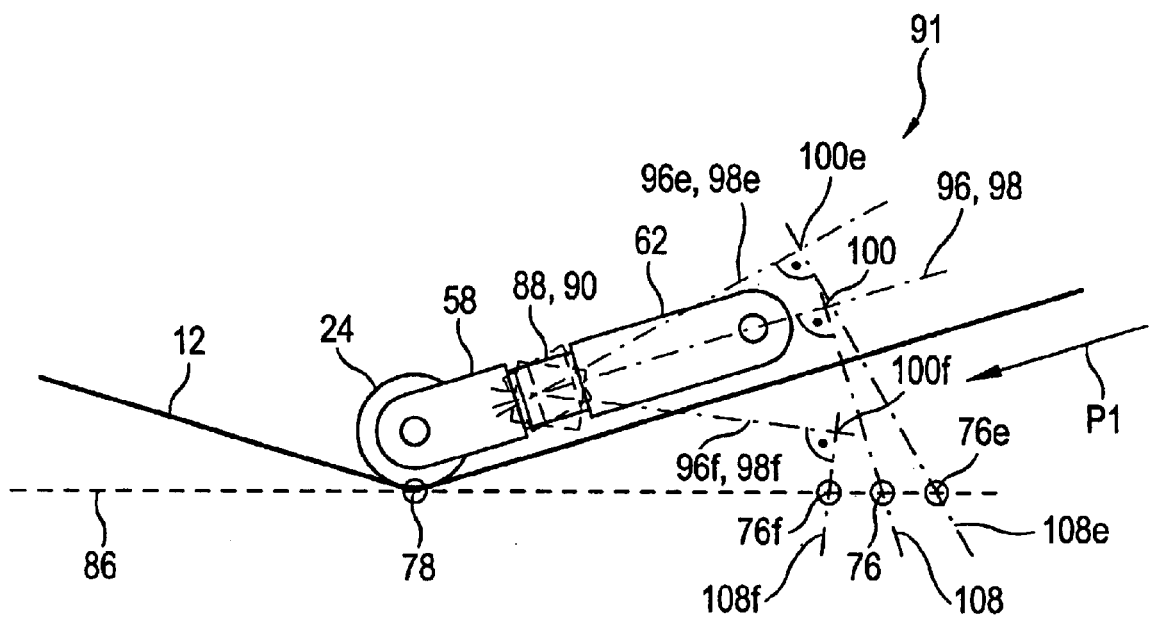
FIG. 13 is a side view that shows the change in the rotational axis for different leaf spring arrangements.

In FIG. 13, a tensioning device 91 having a further alternative arrangement of the leaf springs 88 and 90 is illustrated. In a first alternative, the leaf springs 88 and 90 are arranged such that the pole lines 96 and 98 are rotated to the position 96e and 98e in the mathematical positive direction of rotation. By rotating the pole lines 96 and 98, the position of the point of intersection 100e and of the rotational axis 108e running through this point of intersection 100e perpendicularly to the pole lines 96 and 98 is likewise rotated, as a result whereof the distance of the point of intersection 76e of the rotated rotational axis 108e and the tangent 86 is displaced such that the distance between the point of intersection 78 and the point of intersection 76e is greater than the distance between the point of intersection 78 and the point of intersection 76. The trail of the roller 24 is thus increased.

If, in a second alternative, the leaf springs 88 and 90 are rotated in the mathematical negative direction of rotation such that the pole lines 96 and 98 assume the positions 96f and 98f, then there results a rotational axis 108f which intersects the tangent 86 in the point of intersection 76f. The distance between the point of intersection 78 and the point of intersection 76f is smaller than the distance between the point of intersection 78 and the point of intersection 76, as a result whereof a smaller trail of the roller 24 is set. By a different arrangement of the leaf springs 88 and 90 about a rotational axis parallel to the longitudinal axis of the roller 24, the degree of trail can be simply varied and adapted to the respective belt drive 10 as well as to different belts 12.

Figure 14:
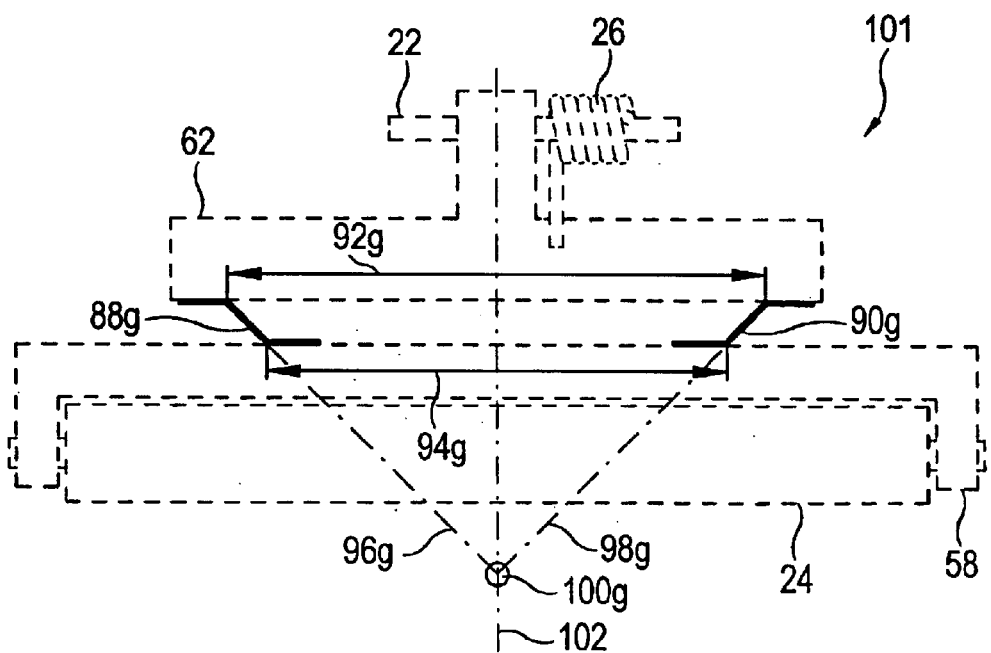
FIG. 14 is an end view that shows a tensioning device in which the position of the center of revolution results in an unstable run of the belt.

In FIG. 14, a top view of a tensioning device 101 is illustrated, in which the leaf springs 88g and 90g are arranged such that the distance 92g of the leaf springs 88g and 90g at the tensioning element 62 is greater than the distance 94g of the leaf springs 88g and 90g at the roller support 58. As a result thereof, the center of revolution 100g and thus also the rotational axis 108 is displaced on the bisector 102 such that the roller 24 has no trail, but a lead. The rotational axis 108 intersects the tangent 86 (not shown) in the direction of motion P1 of the belt 12 (not shown) after the point of tangency 78 of the roller 24 and the belt 12. In contrast to a tensioning device 91 according to one of the FIGS. 9 to 12, the tensioning device 101 according to FIG. 14 has no trail and thus forms no pulled roller 24. Already in the case of a slight non-parallel alignment of the rollers of the belt drive 10, the tensioning device 101 causes an unsteady run of the belt 12. Due to such a non-parallel alignment of the rollers or due to a slightly conical belt 12, a different tension force of the tensioning device 101 acts on the belt 12 transversely to the running direction of the belt 12. A safe run of the belt 12 is then no longer guaranteed with a tensioning device 101 according to FIG. 14.

Figure 15:
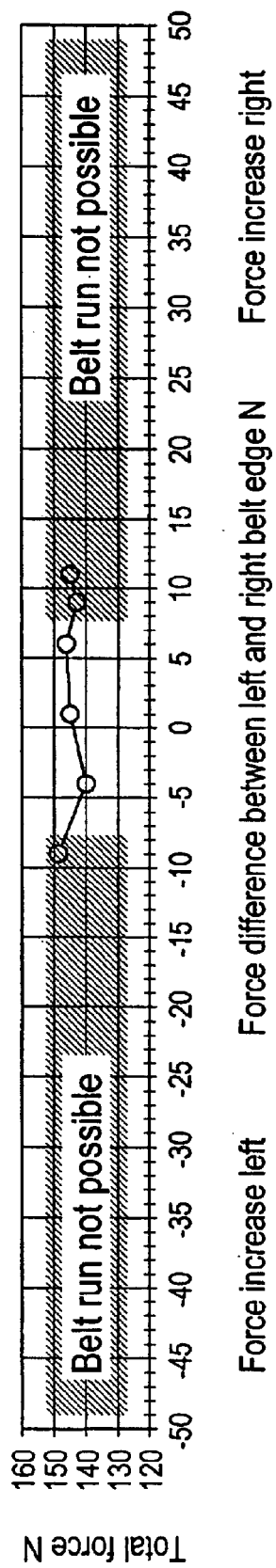
FIG. 15 is a diagram in which the effect of an asymmetric force on the belt run is illustrated with regard to a tensioning device according to FIG. 2.

In FIG. 15, a diagram is illustrated that shows the effects of a varying tension force acting transversely to the belt for a tensioning device 18 according to FIG. 2 or 6. In such a tensioning device 18, in which the roller 24 has no trail, a belt run is not possible with a difference in tension force of ±8 N between the left and right belt edges. In this tensioning device and with a difference in tension force of ±8 N transverse to the direction of motion of the belt 12, even with a rotation of the drive roller 16 a compensation is no longer possible.

Figure 16:
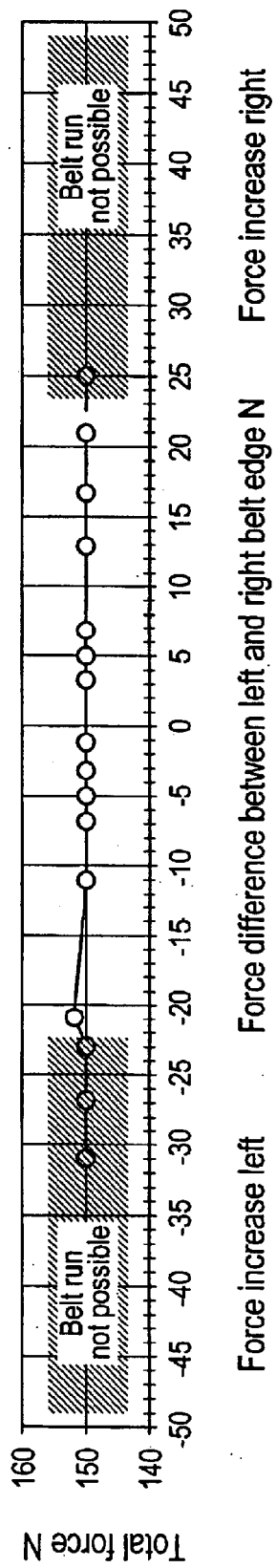
FIG. 16 is a diagram in which the effect of an asymmetric force on the belt is shown with regard to a tensioning device illustrated in FIG. 7.

In FIG. 16, a diagram is illustrated in which the range of a possible belt run depending on the difference in tension force transverse to the belt 12 is shown relative to the total tension force for a tensioning device 85 according to FIG. 7. In this tensioning device 85, a safe belt run is possible up to a difference in force of ±22.5 N from left to right belt edge. As a result thereof, a safe belt run is guaranteed in this tensioning device even when there exists a relative large difference in force of the tension force between the left and right belt edges.

Figure 17:
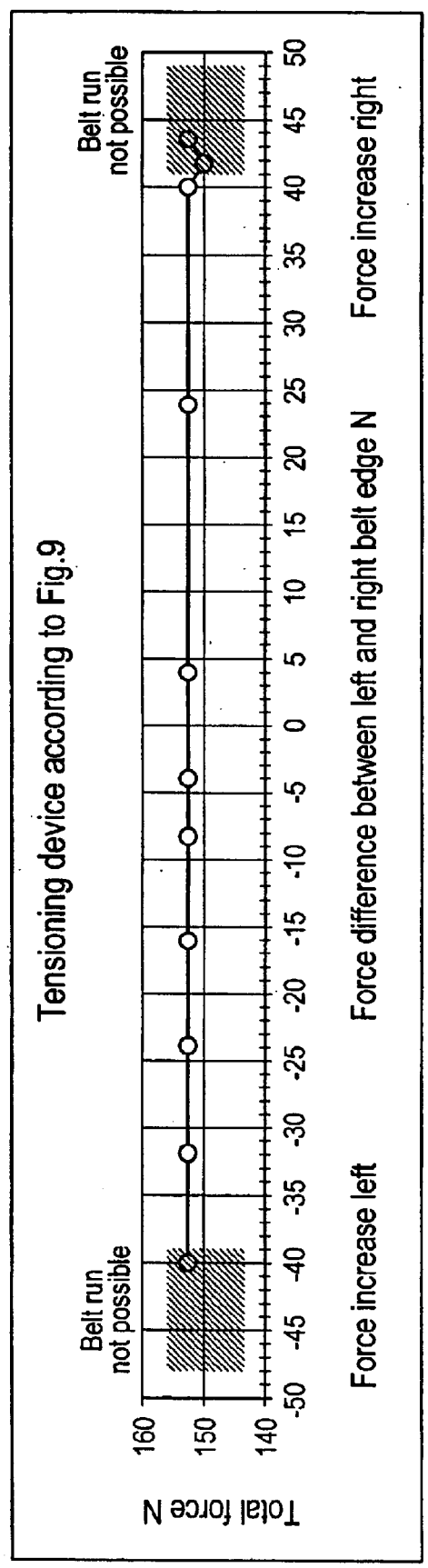
FIG. 17 is a diagram in which the effects of an asymmetric force on the belt material with regard to a tensioning device according to FIG. 9 are illustrated.

In FIG. 17, a diagram illustrates the range of a safe belt run in a tensioning device 91 according to FIG. 9 depending on the difference in tension force transverse to the belt 12. In the tensioning device 91, a safe belt run is possible even at differences in force of ±39.5 N. A safe belt run is thus also possible in the case of a non-parallel alignment of the rollers 24, 28, 30, 32, 34, 36 and 38 and with a slightly conical belt, without the need to use further measures or components that are to be manufactured in a complicated manner. As a result thereof, the belt 12 is not only tensioned by the tensioning device 91 according to FIG. 9 but also guided safely.

Figure 18:
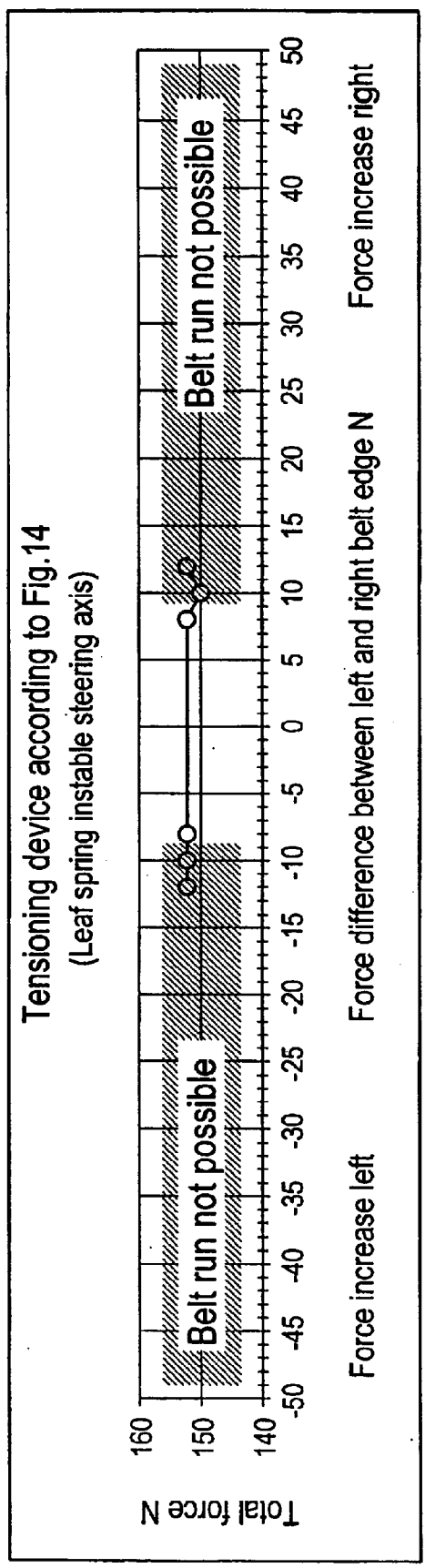
FIG. 18 is a diagram that shows the effects of an asymmetric tension force on the belt run with regard to a tensioning device according to FIG. 14.

In FIG. 18, a diagram is illustrated that shows a possible belt run for a difference in tension force transverse to the belt 12 depending on the total tension force in a tensioning device 101 according to FIG. 14. In this tensioning device 101, the roller 24 of which has no trail, a safe belt run is only guaranteed up to a difference in tension force between right and left belt side of ±8 N with a total tension force of about 150 N. In this tensioning device 101, additional measures have to be taken in order to guarantee a safe belt running.

In other embodiments of the invention, ball-bearing or roller-bearing pivots can be used instead of the pivot 60 that is mounted in a plain bearing. The angles of inclination of the pivot 60 relative to the longitudinal axes of the tension element 62 and of the roller support 58 can be varied depending on the requirements and structural conditions of the belt drive 10. As a result thereof, the position and the inclination of the rotational axis 108 and therefore trail can be set.

In the tensioning device 91 according to FIGS. 9 through 13, Z-shaped curved leaf springs 88 and 90 have been used.

Other shapes of leaf springs are possible. For tensioning devices 18 with leaf springs 88 and 90, the belt guiding characteristics of the tensioning device 18 can easily be adapted to the conditions of the belt drive 10 by changing the arrangement of the leaf springs 88 and 90, as already explained in the description regarding FIGS. 9 through 13. In the inventive tensioning devices usual component tolerances of the mechanical structure of the belt drive 10 can be maintained and do not have to be tightened since an inventive tensioning device guarantees a safe belt run even with a not exactly parallel alignment of the rollers or a slightly conical belt 12. The use of leaf springs 88 and 90 in the rotary device for rotating the roller 24 transversely to the direction of motion of the belt 12 allows to do without such elements for the mounting of the rotary elements, for example, the pivot 60, that are expensive and complicated to install. On the contrary, simple cost-efficient leaf springs 88 and 90 are used. With the tensioning device 91 according to FIGS. 9 through 13, the guidance of the belt can be considerably improved and the manufacturing costs of the belt drive 10 can be considerably reduced. Comprehensive setting work at the belt drive 10 during start and maintenance of the printer or copier is omitted. In other embodiments, the leaf springs 88 and 90 are connected to one another so that they form a leaf spring element.

Figure 19:
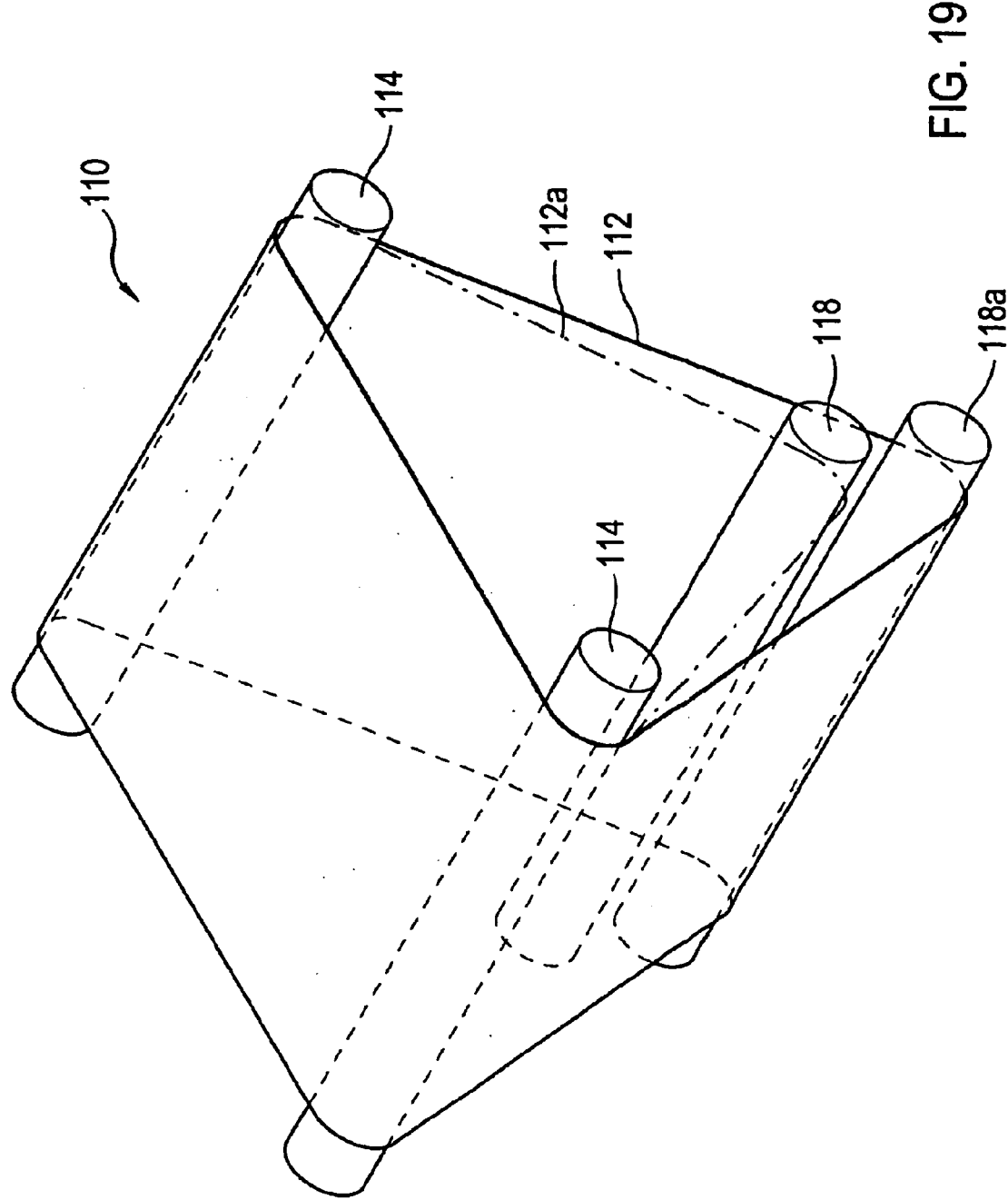
FIG. 19 is a perspective view that shows a circulating belt that is guided over three rollers, the roller positions being illustrated for two different belt lengths.

FIG. 19 is a perspective view of a belt drive 110 in which a belt 112 is guided over rollers 114, 116 and 118. When the belt 112, for example during maintenance of the printer or copier, is replaced by a new shorter belt 112*a*, the position of the roller 118 is set such that it assumes the roller position 118*a*. The roller 118 is thus the tension roller of the belt drive 110.

Figure 20:
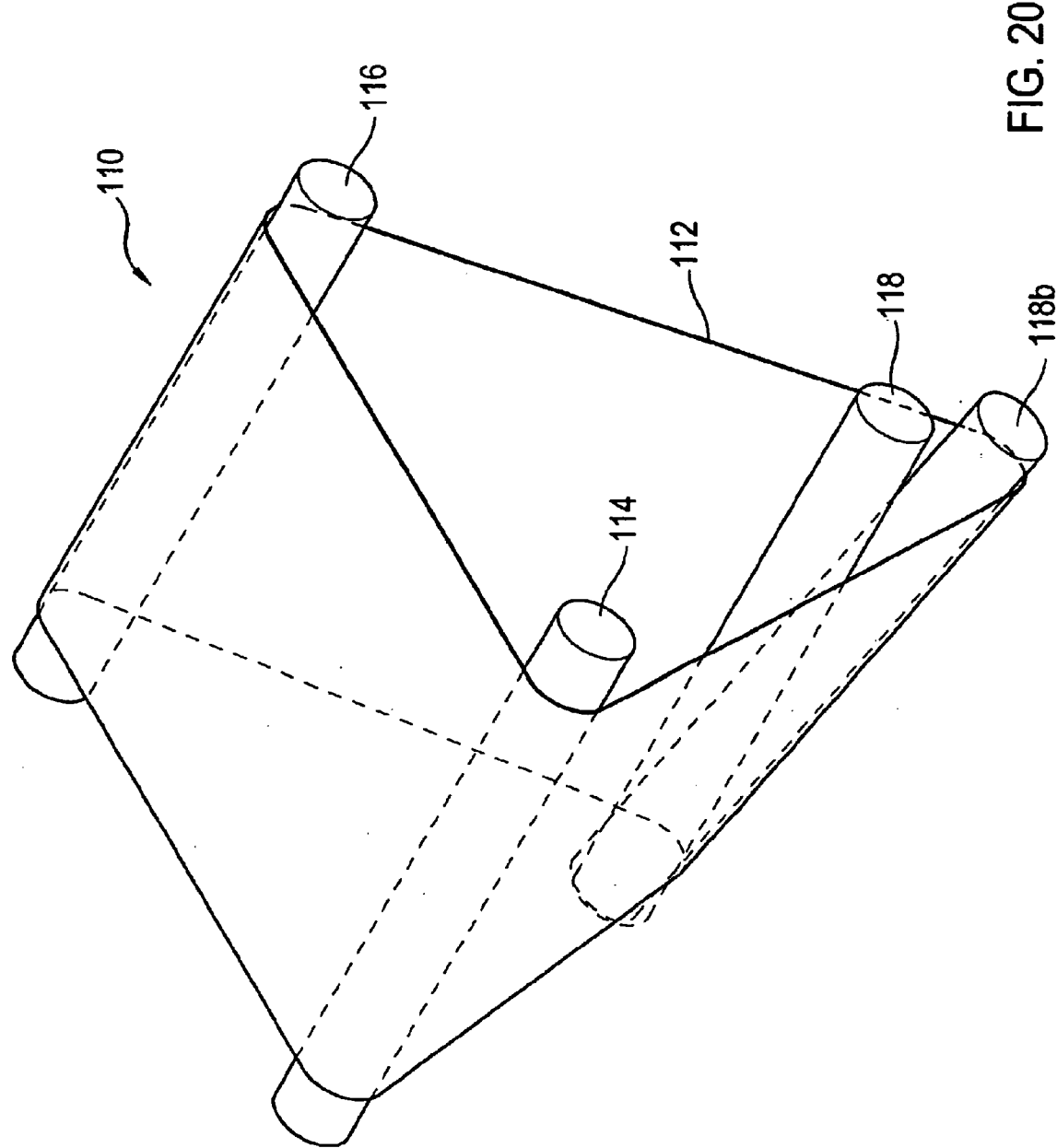
FIG. 20 is a perspective view that shows the arrangement according to FIG. 19, the positions of the rollers being illustrated for the use of a conical belt.

In FIG. 20, the belt drive 110 is illustrated, the belt 112 having a conicality. The tension roller 118 compensates for this conicality of the belt 112 by the roller 118 assuming the position 118*b*.

Figure 21:
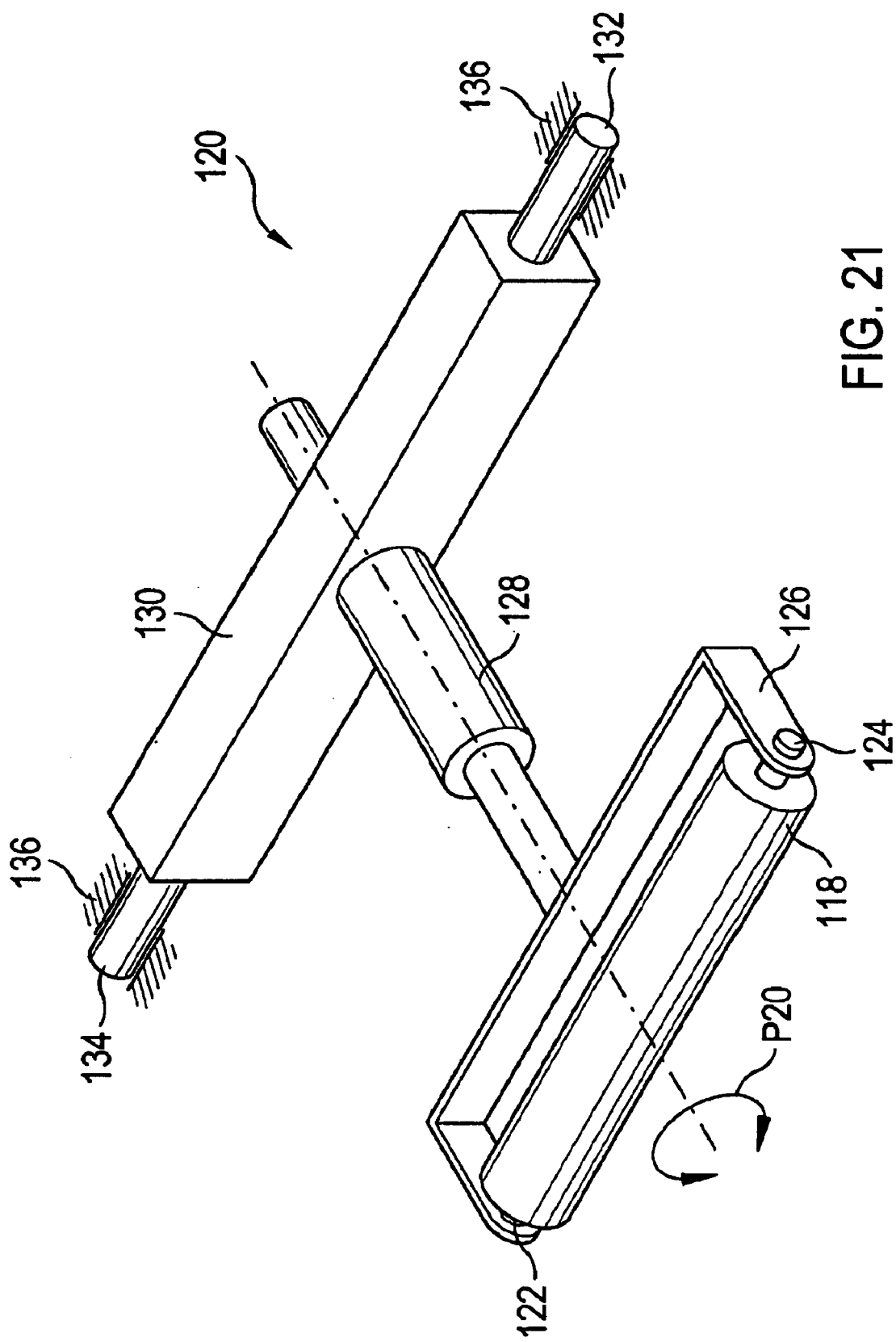
FIG. 21 is a perspective view that shows a known roller rotary arrangement.

In FIG. 21, a tensioning device 120 is illustrated which includes the roller 118. Such a tensioning device 120 is, for example, disclosed in the International Patent Application WO 01/11432 A1. The ends 122 and 124 of the roller 118 are mounted in a roller support 126. The roller support 126 is connected to a swivel arrangement 130 via a rotary arrangement 128. The swivel arrangement 130 has cylindrical ends 132 and 134 that are rotatably connected to a frame 136 of the printer or copier. With the aid of the rotary arrangement 128, the roller support 126 with the roller 118 can be rotated in the direction of the arrow P20. A conicality of the belt 112 can be compensated for by such a rotation.

With the aid of a further drive unit, the tensioning device 120 can be pivoted about the cylindrical ends 132 and 134 in order to tension the belt 112 with a set tension force. Especially the components of the rotary arrangement 128 may only have little manufacturing tolerances in the tensioning device 120 according to FIG. 21 in order to guarantee a safe guidance of the belt 112. As a result thereof, however, the manufacture of the components of the rotary arrangement 128 is very cost-intensive. The drive unit for the rotation of the roller 118 with the aid of the rotary arrangement 128 is likewise complicated and cost-intensive.

Figure 22:
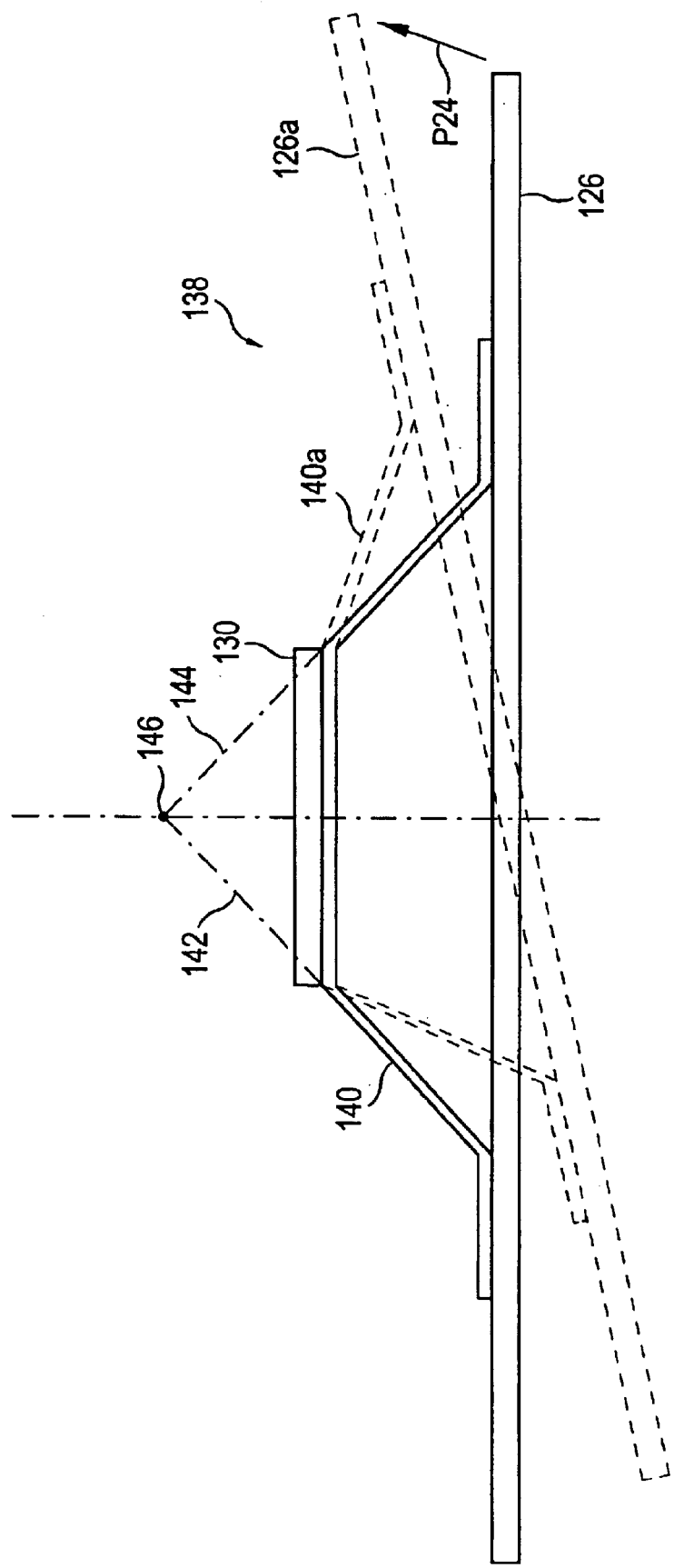
FIG. 22 is an end view that shows a roller rotary arrangement according to the invention.

In FIG. 22, a first embodiment of an inventive rotary arrangement 138 for the rotation of the roller support 126 is illustrated. The rotary arrangement 138 includes a leaf spring 140 which connects the swivel arrangement 130 and the roller support 126. The leaf spring 140 is rigidly connected to the swivel arrangement 130 as well as to the roller support 126. At rest, the swivel arrangement 130, the roller support 126 and the leaf spring 140 form a trapezoid, preferably an isosceles trapezoid, the swivel arrangement 130 and the roller support 126 forming the parallel sides of the trapezoid. The legs of the trapezoid are formed by the leaf spring 140.

The base line of the trapezoid that is formed by the roller support 126, is longer than the base line of the trapezoid that is formed by the swivel arrangement 130. The arrangement of the leaf spring 140, the swivel arrangement 130 and the roller support 126 forms a quadrilateral link, the orientation of the pole lines 142 and 144 being formed by those parts of the leaf spring 140 that form the legs of the trapezoid. The point of intersection of the pole lines 142 and 144 forms the center of revolution 146 of the quadrilateral link. Extending orthogonally to the pole lines 142 and 144, the rotational axis of the rotary arrangement 138 runs through the center of revolution 146. When a force is exerted on the roller support 126 in the direction of the arrow P24, the roller support 126 is rotated to the position 126*a*, the leaf spring 140 assuming the position 140*a*. In the position 140*a*, the leaf spring 140 is illustrated in broken lines. The rotation of the roller support 126 can either be effected by a drive means (not shown) or by a force exerted by the belt 112 on the roller 118.

Figure 23:
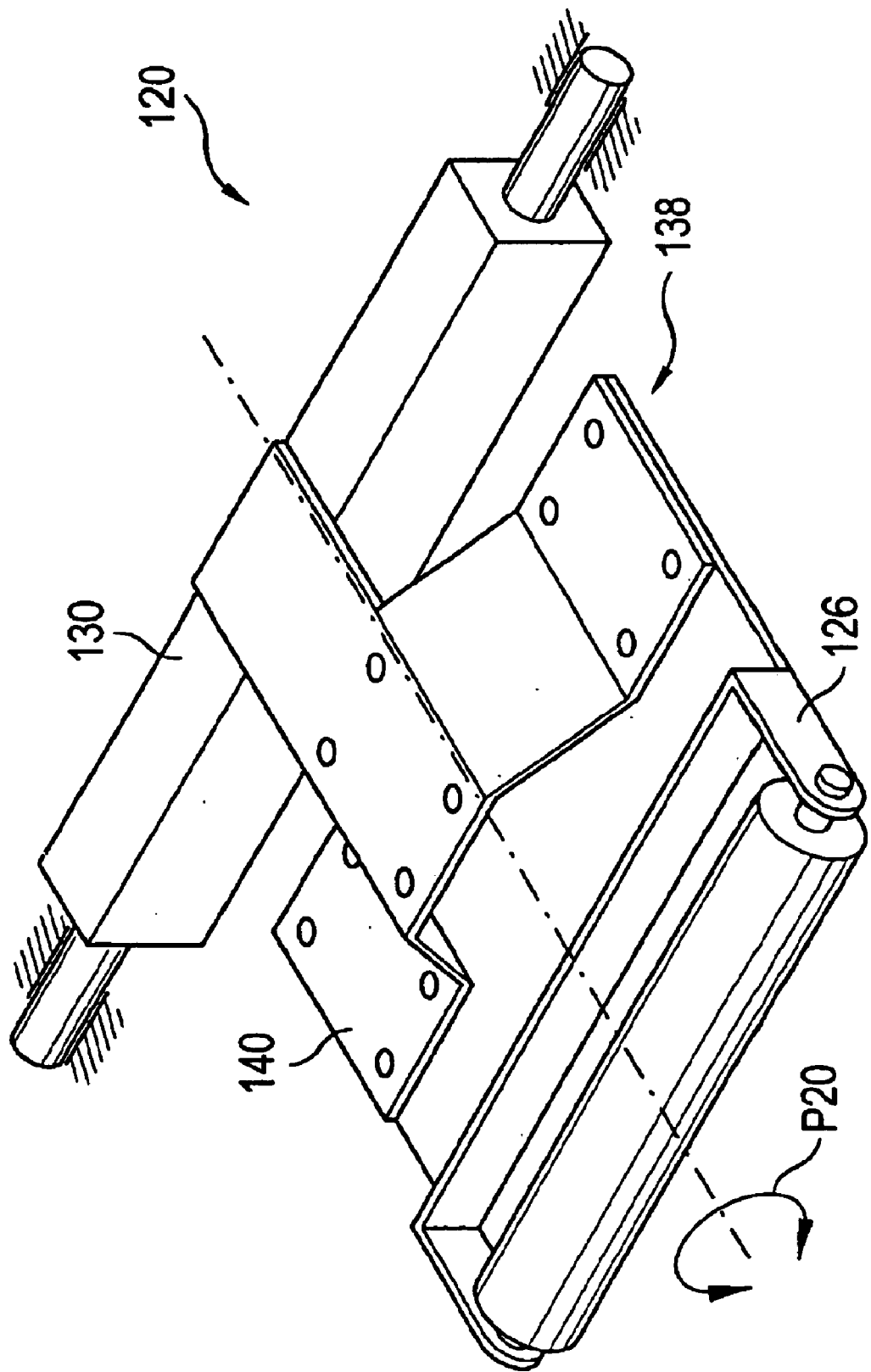
FIG. 23 is a perspective view that shows a second embodiment of a roller rotary arrangement according to the invention.

In FIG. 23, the tensioning device 120 according to FIG. 21 with the rotary arrangement 138 according to FIG. 22 is shown in a perspective illustration. The rotary arrangement 138 includes the leaf spring 140, as a result whereof the roller 118 can be rotated in the direction of the arrow P20. With the aid of the tensioning device 120, both, a length compensation of the belt 112 can be effected by swiveling the roller 118 with the aid of the swivel arrangement 130 and the conicality of the belt 112 and a non-parallel alignment of the rollers 114 and 116 can be compensated for by rotation of the roller support 126 in direction of the arrow P20. The rotary arrangement 138 can be manufactured in a very cost efficient manner and does not include any components that are subject to wear. The restoring force of the roller 118 can be influenced by varying the spring force of the leaf spring 140 and by the slope of the legs of the trapezoid and by the distance of the legs of the trapezoid to one another.

In other embodiments, the leaf spring 140 can also include a plurality of spring elements. The leaf spring 140 can, for example, be manufactured of two parts. Instead of the leaf spring 140, other spring elements can likewise be used, in particular arrangements with spiral springs or with elastic elements, such as elastomers.

Figure 24:
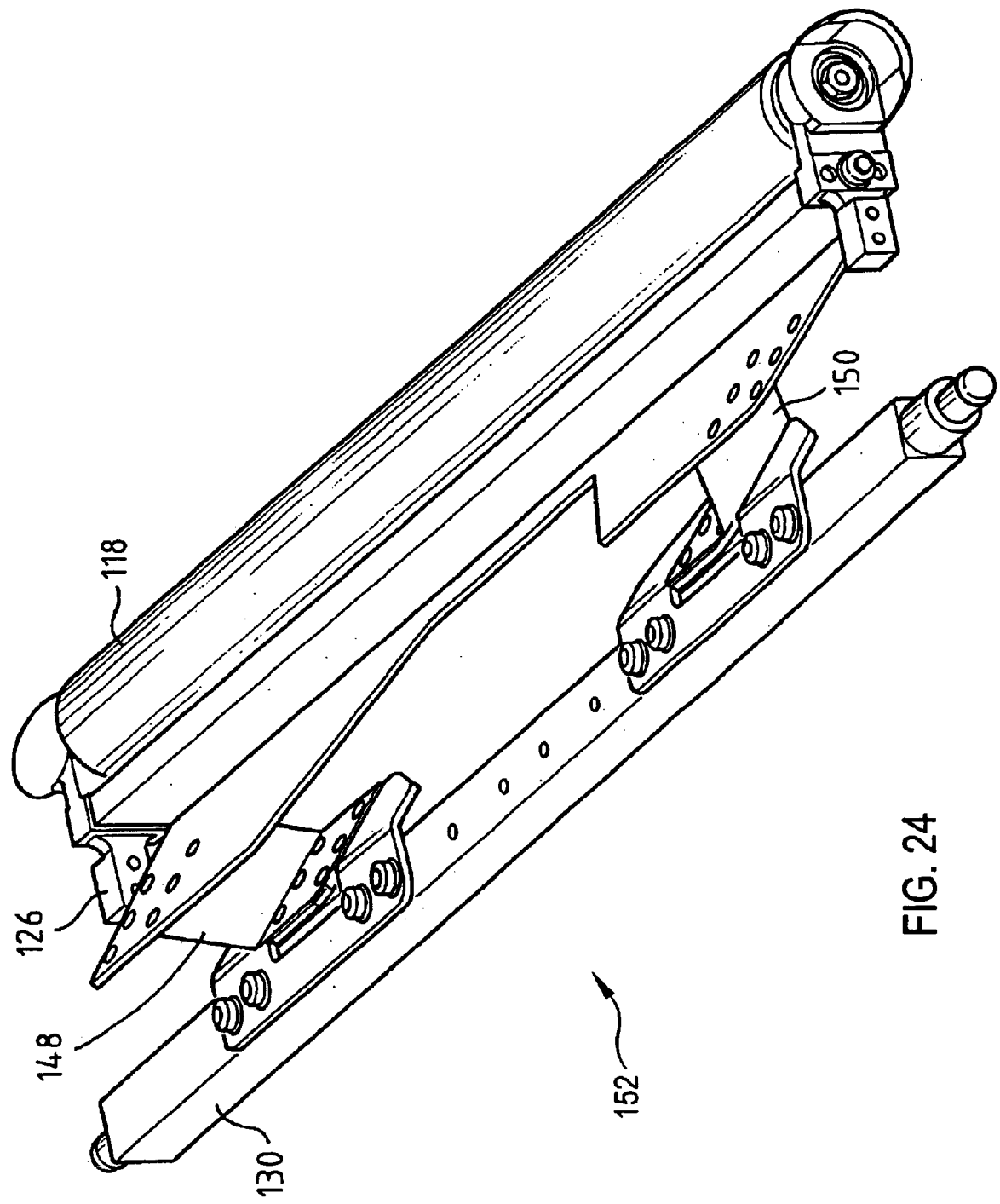
FIG. 24 is a perspective view that shows a third embodiment of a roller rotary arrangement according to the invention.

In FIG. 24, a second embodiment of an inventive rotary arrangement 152 is illustrated. The roller support 126 is rotatably connected to the swivel arrangement 130 with the aid of a first leaf spring arrangement 148 and a second leaf spring arrangement 150. The leaf springs 148 and 150, the swivel arrangement 130 and the roller support 126 form, as already described in connection with FIG. 22 for the leaf spring 140, a quadrilateral link having a trapezoidal arrangement. The center of revolution of the quadrilateral link can lie outside the belt drive 10 in the arrangement according to FIG. 24 as well as in the arrangements according to FIG. 22 or 23. If a trail of the roller 118 is effected, a higher running stability of the belt 112 is achieved, as already explained in connection with FIGS. 1 to 18.

For a rotary arrangement 138 and 152, only few components are required that can be manufactured very cost-efficiently. The rotary arrangement 138 and 152 according to the invention guarantees a friction-free mounting so that the so-called stick-slip-effects can be avoided. In contrast to the rotary arrangement 128 according to FIG. 21, the rotary arrangements 138 and 152 do not have a bearing clearance. A stable belt run is thus possible. Depending on the structure, the rotary arrangements 138 and 152 can perform a tilting motion of up to ±5° that is imperative due to the conicality of the belt 112. A defined restoring force can easily be set via the spring force of the leaf springs 140, 148 and 150. By means of the isosceles quadrilateral link, that is formed by the leaf spring 140 or, respectively, by the leaf springs 148 and 150, a defined rotation of the roller support 126 with the roller 118 is possible in the case of a force exerted by the belt 112 on the roller 118. Such a quadrilateral link is also referred to as a four-bar linkage.

Although other modifications and changes may be suggested by those skilled in the art, it is the intention of the inventors to embody within the patent warranted hereon all changes and modifications as reasonably and properly come within the scope of their contribution to the art.

We claim:

1. An apparatus for guiding a belt-shaped continuous carrier material in an electrographic printer or copier, comprising:
   a belt-shaped continuous carrier material;
   at least one roller element over which said belt-shaped continuous carrier material is guided, said at least one roller element having a longitudinal axis running substantially transversely to a conveying direction of said carrier material during normal operation;
   at least one rotary arrangement by which said at least one roller element is rotatable about a rotational axis running substantially orthogonally to the longitudinal axis, the rotational axis intersecting said carrier material as viewed in the conveying direction before a bisector of a circular arc of said at least one roller element that is covered with said carrier material.

2. An apparatus according to claim 1, wherein said roller element is pulled with respect to the conveying direction of the carrier material.

3. An apparatus according to claim 2, wherein said roller element is mounted so that it has a trail.

4. An apparatus according to claim 1, wherein the longitudinal axis of said at least one roller element and the rotational axis are arranged so as to be skew with respect to one another.

5. An apparatus according to claim 1, wherein said carrier material is a circulating belt.

6. An apparatus according to claim 5, wherein said circulating belt is one of a photoconductor belt and a transfer belt and an applicator belt.

7. An apparatus according to claim 1, wherein the carrier material is a paper web.

8. An apparatus according to claim 1, further comprising:
   a lever arm arrangement mounted to guide said at least one roller element;
   a spring mounted to bias said lever arm arrangement, said spring having a spring force pressing said at least one roller element against the carrier material.

9. An apparatus according to claim 1, wherein said at least one roller element is pivotable about the rotational axis such that a conicality of at least one of the carrier material and said at least one roller element is compensated for.

10. An apparatus according to claim 1, wherein said at least one rotary arrangement includes a pivot having a longitudinal axis which is the rotational axis.

11. An apparatus according to claim 1, wherein said at least one rotary arrangement includes at least one leaf spring.

12. An apparatus according to claim 11, wherein said at least one rotary arrangement includes at least two leaf spring elements that are arranged at a distance to one another substantially transversely to the conveying direction of the carrier material such that the rotary arrangement forms a four-bar linkage.

13. An apparatus according to claim 12, wherein the rotational axis runs through a center of revolution of the four-bar linkage.

14. An apparatus according to claim 1, wherein the rotational axis runs orthogonally to the longitudinal axis of said at least one roller element approximately in a center thereof.

15. An apparatus according to claim 1, further comprising:
   a second roller element over which the carrier material is guided, said second roller element having a longitudinal axis running substantially transversely to the conveying direction of the carrier material during normal operation;
   a second rotary arrangement by which said second roller element is rotatable a rotational axis running substantially orthogonally to the longitudinal axis of said second roller element, said second rotary arrangement being operable to adjust a track of the carrier material.

16. An apparatus according to claim 1, further comprising:
   further roller elements over which the carrier material is guided, said further roller elements being arranged transversely to the conveying direction of the carrier material; and
   rigid coupler levers connecting said further roller elements to one another.

17. An apparatus according to claim 1, wherein said carrier material is a first carrier material, and further comprising:
   a second carrier material in a transfer printing region;
   in a first operating condition, said first carrier material being arranged in the transfer printing region near said second carrier material in order to transfer a toner image;
   in a second operating condition, said first carrier material being arranged remote from said second carrier material in order to prevent transfer of a toner image; and
   the belt tension of the carrier material being substantially constant in both said first and said second operating conditions.

18. A method for guiding a belt-shaped continuous carrier material in an electrographic printer or copier, comprising the steps of:
   guiding a belt-shaped continuous carrier material over at least one roller element, a longitudinal axis of said at least one roller element running substantially transversely to a conveying direction of said carrier material during normal operation;
   rotating said at least one roller element by at least one rotary arrangement about a rotational axis running substantially orthogonally to the longitudinal axis; and
   positioning said carrier material as viewed in the conveying direction thereof to be intersected by the rotational axis before a bisector of a circular arc of said at least one roller element that is covered with said carrier material.

19. An apparatus for guiding a belt-shaped continuous carrier material in an electrographic printer or copier, comprising:

a belt-shaped continuous carrier material;

at least one roller element over which said carrier material is guided;

a roller support in which ends of said at least one roller element are mounted;

a frame;

at least one elastic fastener that connects said at least one roller support to said frame such that said at least one roller support is at least one of longitudinally displacable relative to said carrier material and transversely tiltable relative to said carrier material, wherein said at least one elastic fastener includes at least one leaf spring which together with said at least one roller support and said frame forms a four-bar linkage.

20. An apparatus according to claim 19, wherein the rotational axis runs through a center of revolution of the four-bar linkage.

21. An apparatus for guiding a belt-shaped continuous carrier material in an electrographic printer or copier, comprising:

a belt-shaped continuous carrier material;

at least one roller element over which said carrier material is guided;

a roller support in which ends of said at least one roller element are mounted;

a frame;

at least one elastic fastener that connects said at least one roller support to said frame such that said at least one roller support is at least one of longitudinally displacable relative to said carrier material and transversely tiltable relative to said carrier material, wherein said elastic fastener exerts a restoring force on said at least one roller element when said at least one roller element is rotated from a position transverse to said carrier material.

* * * * *